US009552800B1

(12) United States Patent
Pogoda

(10) Patent No.: US 9,552,800 B1
(45) Date of Patent: Jan. 24, 2017

(54) PIANO KEYBOARD WITH KEY TOUCH POINT DETECTION

(71) Applicant: Gary S. Pogoda, Atlantic City, NJ (US)

(72) Inventor: Gary S. Pogoda, Atlantic City, NJ (US)

( * ) Notice: Subject to any disclaimer, the term of this patent is extended or adjusted under 35 U.S.C. 154(b) by 0 days.

(21) Appl. No.: 15/146,024

(22) Filed: May 4, 2016

Related U.S. Application Data

(60) Continuation-in-part of application No. 14/224,625, filed on Mar. 25, 2014, which is a division of application No. 13/491,045, filed on Jun. 7, 2012, now Pat. No. 8,710,344.

(51) Int. Cl.
*G10H 1/18* (2006.01)
*G10H 1/34* (2006.01)
*G10H 1/22* (2006.01)

(52) U.S. Cl.
CPC ............ *G10H 1/344* (2013.01); *G10H 1/18* (2013.01); *G10H 1/22* (2013.01); *G10H 2220/241* (2013.01)

(58) Field of Classification Search
CPC ........................................... G10H 1/18
USPC ................................... 84/615, 653
See application file for complete search history.

(56) References Cited

U.S. PATENT DOCUMENTS

| 4,686,880 A * | 8/1987 | Salani | G10H 1/182 |
| | | | 341/26 |
| 4,892,023 A * | 1/1990 | Takeuchi | G10H 1/0556 |
| | | | 84/687 |
| 5,088,378 A * | 2/1992 | DeLaTorre | G10H 1/34 |
| | | | 84/423 R |
| 5,099,738 A * | 3/1992 | Hotz | G10H 1/0075 |
| | | | 84/617 |
| 5,129,303 A * | 7/1992 | Coles | G10H 1/0008 |
| | | | 84/442 |

(Continued)

*Primary Examiner* — David Warren
(74) *Attorney, Agent, or Firm* — Norman E. Lehrer

(57) ABSTRACT

The present invention provides touch sensor means for detecting the touch location along the length of an outfitted piano key as it is pressed, so as to then offset the notes of an associated piano keyboard accordingly during play. When such an outfitted key is pressed in combination with other piano keys, the touch location along the length of the outfitted key, and the separation intervals and timing of the key presses, are analyzed to determine the intended chord, such that before any notes are sounded, the notes of the pressed keys are configured for the sounding of that chord. This arrangement enables playing a wide range of notes using just a few keys, so as to provide a substantially reduced-size keyboard with full-sized keys sufficient for real-time playing. This arrangement also enables configuring the note offsets of those pressed keys to conform to a selected musical key, so as to simplify the layout of the keyboard by eliminating its black keys, while still supporting the playing of non-conforming notes. This arrangement further enables applying pitch variation to those note offsets in order to emulate the "string stretching," "whammy bar," and "fretless neck" playing techniques for guitars and basses. This arrangement even further enables playing advanced chords in a simplified manner. Finally, this arrangement enables providing a wide assortment of keyboards that can differ in the type, number, size, and functionality of their outfitted keys.

6 Claims, 17 Drawing Sheets

(56) References Cited

U.S. PATENT DOCUMENTS

| | | | | |
|---|---|---|---|---|
| 5,471,008 A * | 11/1995 | Fujita | G10H 1/0066 | 84/477 R |
| 5,502,274 A * | 3/1996 | Hotz | G10H 1/0075 | 84/451 |
| 5,619,003 A * | 4/1997 | Hotz | G10H 1/0075 | 84/615 |
| 5,726,374 A * | 3/1998 | Vandervoort | G10H 1/28 | 84/638 |
| 6,057,503 A * | 5/2000 | Shinsky | G10H 1/0025 | 84/613 |
| 6,084,171 A * | 7/2000 | Kay | G10H 1/38 | 84/613 |
| 6,201,178 B1 * | 3/2001 | Shinsky | G10H 1/0025 | 84/613 |
| 6,448,486 B1 * | 9/2002 | Shinsky | G10H 1/0025 | 84/613 |
| 6,501,011 B2 * | 12/2002 | Wesley | G10H 1/0066 | 84/600 |
| 7,105,738 B2 * | 9/2006 | Sim | G10H 1/34 | 84/600 |
| 7,208,670 B2 * | 4/2007 | Sim | G10H 1/34 | 84/609 |
| 7,273,979 B2 * | 9/2007 | Christensen | G10H 1/0066 | 200/512 |
| 7,342,164 B2 * | 3/2008 | Nishibori | G10H 1/0016 | 84/464 R |
| 7,371,957 B2 * | 5/2008 | Nishibori | G10H 1/34 | 84/604 |
| 7,709,724 B2 * | 5/2010 | Nishibori | G10H 1/0016 | 84/609 |
| 8,158,875 B2 * | 4/2012 | Stanger Ramirez | G10H 1/0066 | 84/638 |
| 8,173,884 B2 * | 5/2012 | Gatzsche | G10H 1/0008 | 84/615 |
| 8,614,384 B2 * | 12/2013 | Hotrique | G10C 3/12 | 84/376 R |
| 8,642,875 B2 * | 2/2014 | Kinter | G10H 1/38 | 84/619 |
| 8,822,803 B2 * | 9/2014 | Terry | G10H 1/34 | 84/644 |
| 9,159,307 B1 * | 10/2015 | Ludovici | G10H 1/0066 | |
| 2002/0134223 A1 * | 9/2002 | Wesley | G10H 1/0066 | 84/719 |
| 2003/0121398 A1 * | 7/2003 | Mutou | G10C 3/12 | 84/423 R |
| 2003/0209130 A1 * | 11/2003 | Anderson | G10H 1/34 | 84/443 |
| 2004/0060422 A1 * | 4/2004 | Anderson | G10H 1/34 | 84/443 |
| 2005/0098026 A1 * | 5/2005 | Mutou | G10C 3/12 | 84/744 |
| 2006/0123982 A1 * | 6/2006 | Christensen | G10H 1/0066 | 84/723 |
| 2007/0028754 A1 * | 2/2007 | Hall | G09B 15/004 | 84/745 |
| 2008/0173163 A1 * | 7/2008 | Pratt | G10H 1/20 | 84/645 |
| 2010/0037754 A1 * | 2/2010 | Nishibori | G10H 1/0016 | 84/622 |
| 2011/0100198 A1 * | 5/2011 | Gatzsche | G10H 1/0008 | 84/615 |
| 2011/0203445 A1 * | 8/2011 | Stanger Ramirez | G10H 1/0066 | 84/645 |
| 2012/0031254 A1 * | 2/2012 | Hotrique | G10C 3/12 | 84/423 R |
| 2013/0076542 A1 * | 3/2013 | Tanaka | H03K 17/9647 | 341/22 |
| 2013/0327200 A1 * | 12/2013 | Pogoda | G06F 3/016 | 84/626 |
| 2014/0033897 A1 * | 2/2014 | Bludov | G10C 3/12 | 84/423 R |
| 2014/0076126 A1 * | 3/2014 | Terry | G10H 1/34 | 84/609 |
| 2016/0104471 A1 * | 4/2016 | Hyna | G10H 1/386 | 84/613 |
| 2016/0140944 A1 * | 5/2016 | Bergman | G06F 3/041 | 84/613 |
| 2016/0232883 A1 * | 8/2016 | Velez-Gallego | G10H 1/34 | |

* cited by examiner

| | 312 | 316 | A | B | C | D | E | F |
|---|---|---|---|---|---|---|---|---|
| | Octave | Key | | | | | | |
| 310 | 2 | | 322 | 324 | 326 | 328 | 330 | 332 |
| | 3 | | | | | | | |
| 314 | 4 | C | 318 | | | | | |
| | 5 | C# | | | | | | |
| | 6 | D | | | | | | |
| 368 | | C 5 | 398 | | | | | |
| 366 | | B | 396 | | | | | |
| 364 | | A | 394 | | | | | |
| 362 | | | 392 | | | | | |
| 360 | | F | 390 | | | | | |
| 358 | | E | 388 | | | | | |
| 356 | | D | 386 | | | | | |
| 354 | | C 4 | 384 | | | | | |
| 352 | | B | 382 | | | | | |
| 350 | | A | 380 | | | | | |
| 348 | | G | 378 | | | | | |
| 346 | | F | 376 | | | | | |
| 344 | | E | 374 | | | | | |
| 342 | | D | 372 | | | | | |
| 340 | | C 3 | 370 | | | | | |
| | 120 | | 122 | 124 | 126 | 128 | 130 | 132 |

PIANO KEYBOARD WITH KEY TOUCH POINT DETECTION

CROSS-REFERENCE TO RELATED APPLICATIONS

This application is a continuation-in-part of U.S. patent application Ser. No. 14/224,625, filed Mar. 25, 2014, which was a division of U.S. patent application Ser. No. 13/491,045, now U.S. Pat. No. 8,710,344, filed Jun. 7, 2012.

BACKGROUND OF THE INVENTION

The present invention is directed toward a keyboard with touch sensors for detecting the touch location along the length of an outfitted key as it is being pressed, so as to thereby enable the functionality of the keyboard to be continually reconfigured during play in accordance with the touch location being detected. This reconfiguration can be utilized to enhance that functionality, simplify its use, and substantially reduce the number of keys and keyboard footprint required for its implementation. Such touch detection is particularly applicable to touchscreen, piano-type keyboards; however, it is generally applicable to any keyboard being associated with electronic control, especially where portability is an issue.

There are numerous piano keyboard apps available for iPads, and similar touchscreen devices. The popularity of these apps can be attributed, at least in part, to the portability of those tablets; however, due to the tiny size of their playing surface as compared to a standard piano keyboard, the number of keys available for playing at any given time, is extremely limited, which presents a serious obstruction to the playing of even the simplest piano arrangements.

In an attempt to alleviate this functionality obstruction, apps have typically: reduced key width to display additional keys; reduced key length to display multiple key rows; and provided keyboard repositioning swipes during play for revealing normally off-screen keys. While these measures do increase the number of readily available keys, the reduced key size and additionally required swipes have rendered such apps virtually unusable for real-time play.

Furthermore, since playing even simple arrangements requires a fair amount of skill, keyboards provide preprogrammed buttons for simulating actual playing. While such button pressing does enable beginners to circumvent this learning curve, because it is so far removed from the skills required for piano playing, very little learning is actually accomplished. A keyboard that offered skill simplification rather than complete elimination would be far more advantageous.

For example, consider the learning curve required for the playing of close, root-position chords, which is relatively small compared to that of advanced chord inversion and voicing. Suppose it were possible to play a close, root-position chord, but then configure the keyboard during play to automatically substitute an advanced chord inversion or voicing before any notes are sounded. This would substantially reduce the learning curve required for advanced playing, but would, at the same time, promote the learning of the basic playing skills.

To date, there is no such reconfigurable, piano-type keyboard that offers both full functionality and simplified playing, and especially not at a substantially reduced size. As such, there is a recognized need for a tablet-sized, piano-type keyboard, of either the touchscreen or physical variety, that can be continually reconfigured during play, so as to provide such capabilities.

SUMMARY OF THE INVENTION

The present invention provides touch sensor means for detecting the touch location along the length of an outfitted piano key as it is pressed, so as to then offset the notes of an associated piano keyboard accordingly during play. When such an outfitted key is pressed in combination with other piano keys, the touch location along the length of the outfitted key, and the separation intervals and timing of the key presses, are analyzed to determine the intended chord, such that before any notes are sounded, the notes of the pressed keys are configured for the sounding of that chord. This arrangement enables playing a wide range of notes using just a few keys, so as to provide a substantially reduced-size keyboard with full-sized keys sufficient for real-time playing. This arrangement also enables configuring the note offsets of those pressed keys to conform to a selected musical key, so as to simplify the layout of the keyboard by eliminating its black keys, while still supporting the playing of non-conforming notes. This arrangement further enables applying pitch variation to those note offsets in order to emulate the "string stretching," "whammy bar," and "fretless neck" playing techniques for guitars and basses. This arrangement even further enables playing advanced chords in a simplified manner. Finally, this arrangement enables providing a wide assortment of keyboards that can differ in the type, number, size, and functionality of their outfitted keys.

BRIEF DESCRIPTION OF THE DRAWINGS

For the purpose of illustrating this invention, there are shown in the accompanying drawings forms that are presently preferred; it being understood that the invention is not intended to be limited to the precise arrangements and instrumentalities shown.

FIG. 2 is a top view of a second operational state of the first keyboard embodiment shown in FIG. 1.

DETAILED DESCRIPTION OF THE PREFERRED EMBODIMENT

Figure 1:
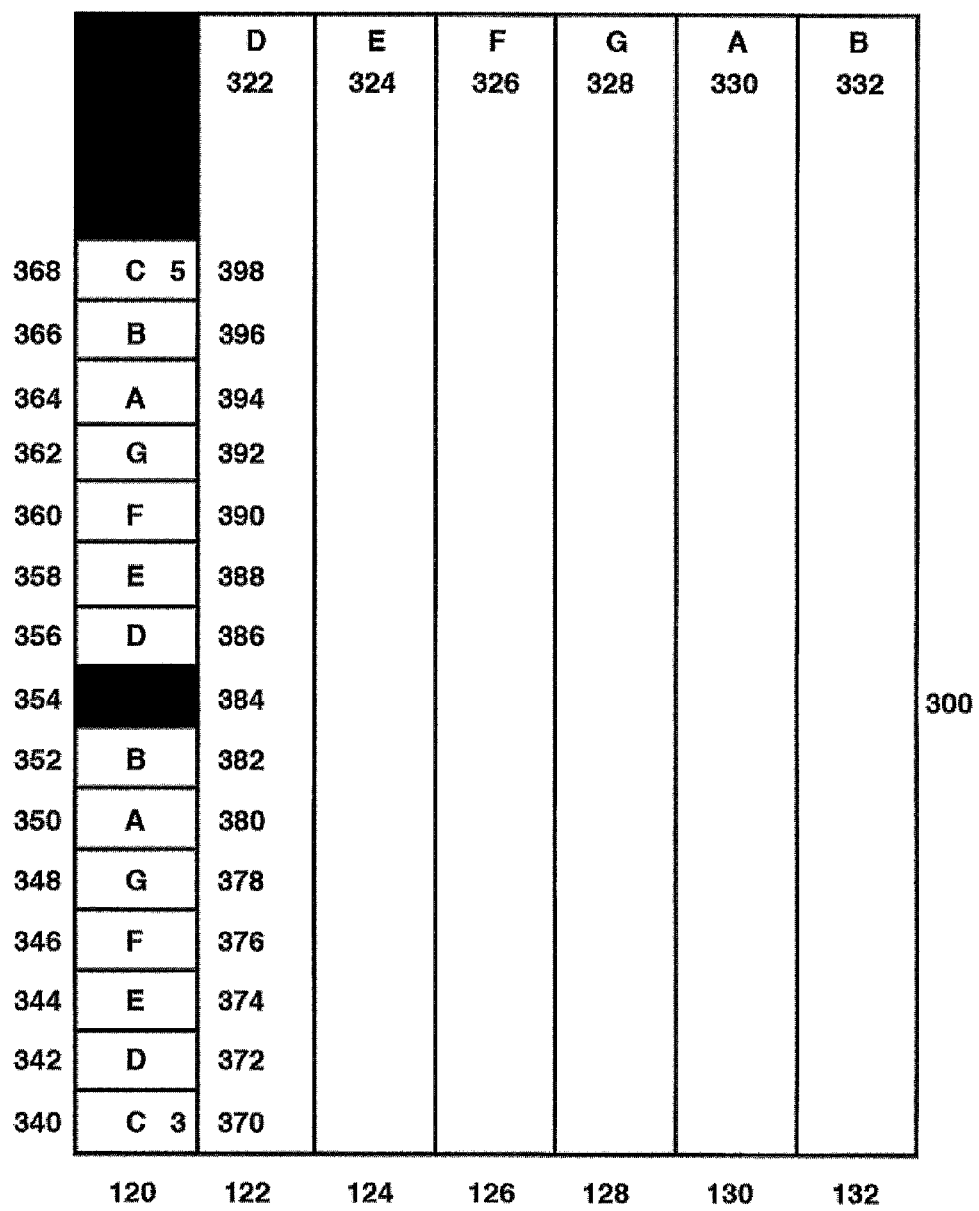
FIG. 1 is a top view of a first operational state of a first embodiment of an iPad, piano-type, touchscreen keyboard.

Referring now to the drawings in detail, like reference numerals have been used throughout the various figures to designate like elements.

Figure 3:
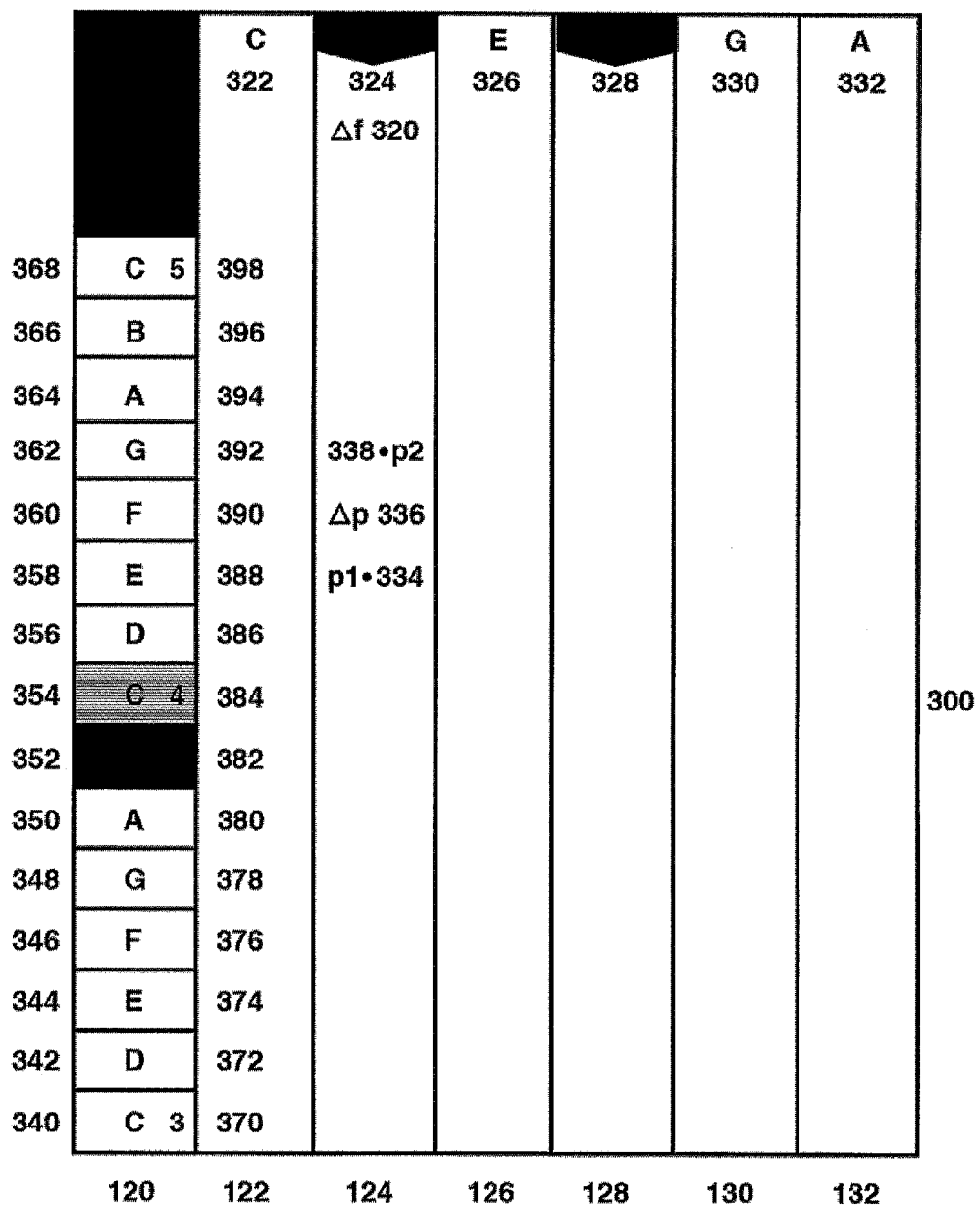
FIG. 3 is a top view of a third and fourth operational state of the first keyboard embodiment shown in FIGS. 1 and 2.

A first embodiment of an iPad, piano-type, touchscreen keyboard of the invention is shown in FIGS. 1, 2, and 3, and is designated generally as 300. This keyboard 300 is comprised of 7, piano-sized, white keys 120, 122, 124, 126, 128, 130, and 132 arranged across the full portrait screen width. The first white key 120 is divided lengthwise into 15 sections 340, 342, 344, 346, 348, 350, 352, 354, 356, 358, 360, 362, 364, 366, and 368. The corresponding notes 370, 372, 374, 376, 378, 380, 382, 384, 386, 388, 390, 392, 394, 396, and 398, respectively, played by touching those sections are set to the first 15 notes (C3-D-E-F-G-A-B-C4-D-E-F-G-A-B-C5) of the 3-octave note sequence C3-D-E-F-G-A-B-C4-D-E-F-G-A-B-C5-D-E-F-G-A-B of the C Major scale, those 15 notes being initially centered around middle C (C4), so as to currently have a center octave of 4.

When the first white key 120 is pressed from one of its sections 340, 342, 344, 346, 348, 350, 352, 354, 356, 358, 360, 362, 364, 366, or 368, the remaining white keys 122, 124, 126, 128, 130, and 132 will be reconfigured in correspondence with a span of 7 white keys on a standard piano keyboard starting with the note 370, 372, 374, 376, 378, 380, 382, 384, 386, 388, 390, 392, 394, 396, or 398 associated with that touched section 340, 342, 344, 346, 348, 350, 352, 354, 356, 358, 360, 362, 364, 366, or 368. As such, if the first white key 120 is progressively pressed from its first section 340 to its last section 368, the corresponding notes of the 7 keys 120, 122, 124, 126, 128, 130, and 132 will progress from C3-D-E-F-G-A-B to C5-D-E-F-G-A-B.

In this manner, with just 7 white keys, a 3-octave keyboard can be implemented in a footprint the size of an iPad screen, while retaining the full key size and basic functionality of a standard piano keyboard, as well as enabling all chords to start from the same key, so as to simplify their playing. This keyboard can also be configured to substitute a chord inversion or alternate chord voicing when a standard, root-position chord is pressed, so as to further simplify the playing of chords. As would be obvious to one skilled in the art, many other configurations and footprints are possible.

FIG. 1 shows a first operational state of the above keyboard 300. As such, the corresponding notes 384, 322, 324, 326, 328, 330, 332 played by the touching of the 7 white keys 120, 122, 124, 126, 128, 130, and 132, respectively, are set to the note sequence C4-D-E-F-G-A-B from the above 3-octave note sequence, starting with the note 'C4' 384 associated with the initially last touched section 354 of the first white key 120.

FIG. 2 shows a second operational state of the above keyboard 300. As such, the touching of section 362 accordingly shifts the corresponding notes 392, 322, 324, 326, 328, 330, and 332 played by the touching of the 7 white keys 120, 122, 124, 126, 128, 130, and 132, respectively, to the note sequence G-A-B-C5-D-E-F from the above 3-octave note sequence, starting with the note 'G4' 392 of the currently touched section 362 of the first white key 120.

FIG. 2 also shows that the keyboard 300 is further comprised of a pop-up data picker 310 with a control wheel 312 to select the current center octave (4) 314, and another control wheel 316 to select the current musical key (C Major) 318. This combination is used to determine the scale and octave range of the above 3-octave note sequence.

FIG. 3 shows a third operational state of the above keyboard 300 corresponding to an initial center octave of 4 and musical key of C Major. As such, the combination of the 3 touched keys 120, 124, and 128 respectively plays the corresponding notes 'A#3' 382, 'D4' 324, and 'F4' 328, where the first note (A#3) 382 does not conform to the current musical key of C Major, but has been programmed to replace the conforming note (B3) normally played by the section 352, so as to enable, in a limited fashion, the playing of notes outside the set of notes conforming to the current center octave and musical key, while using the same keyboard keys that would normally play only conforming notes.

FIG. 3 also shows a fourth operational state of the above keyboard 300. As shown in the figure, there is a first touch position (p1) 334 along the length of the third white key 124, a subsequent position deviation ($\Delta p$) 336 to a second touch position (p2) 338 along that same key 124, and a related frequency deviation ($\Delta f$) 320 in the pitch of the corresponding note 324 being played by that key 124, where continued such position deviations will result in continued such frequency deviations for as long as the touching of the key 124 is maintained, thereby enabling emulation of the string stretching, whammy bar, and fretless neck techniques of guitar and bass playing.

Figure 4:
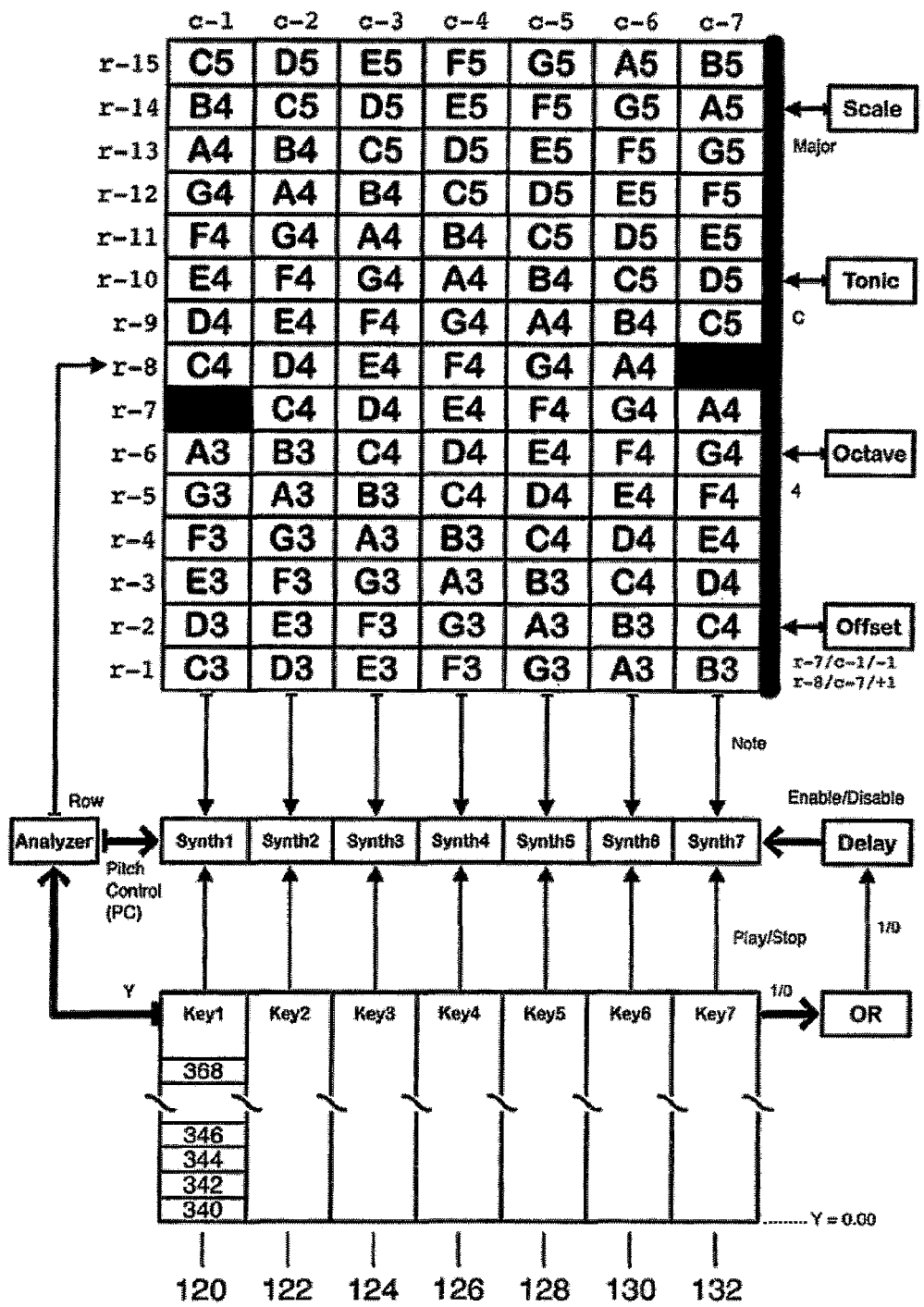
FIG. 4 is a logic diagram of the first keyboard embodiment shown in FIGS. 1 to 3.

A logic diagram for the above keyboard 300 is shown in FIG. 4, and is designated generally as 100. The symbols used in this logic diagram 100 are further explained in the following chart.

```
Delay (from 7-Input OR):
0 to 1 => 1(Enable) -     1-Line Logic    Key:
after delay               ---------->     Pressed          => Y,
0      => 0(Disable) -                    1(Play), 1
immediately               1-Line Data     Released         => OFF,
                          |---------->    0(Stop), 0
Synth (from Key 0/1       7-Line Logic    Analyzer (from Key OFF/Y):
AND Delay 0/1):           -------->       OFF to Y         =>
0 to 1 => Latch Note      7-Line Data     Y0=Y
1      => Play Latched    |-------->      Y                => PC=
       Note                                                Y-Y0
0      => Stop Player                     OFF              => PC=0.00
1 to 0 => N/A                             Key1:OFF to Y    =>
                                          Row=int(Y/m)
```

The diagram 100 logic is preset for the musical key 'Scale' selector to output a value of 'Major', the musical key 'Tonic' selector to output a value of 'C', and the center 'Octave' selector to output a value of '4', which presets the notes of row 'r-8', for columns 'c-1' through 'c-7', to the notes of the C Major key, beginning with note 'C4' (namely, C4, D4, E4, F4, G4, A4, and B4). Successive rows above and below r-8 are also preset with the notes of the C Major key, but starting at notes successively above and below 'C4', respectively. The note 'Offset' selector is initially set to modify the note at 'r-8'/'c-7' by +1 semitone to 'C5', and the note at 'r-7'/'c-1' by −1 semitone to 'A#3'. This provides for the playing of custom chords arrangements, as well as for the playing of chords outside the C Major key, both of which would not otherwise be possible.

The initial 'Row' value being output from the 'Analyzer' is internally preset to 'r-1' and is not user selectable. This 'Row' value causes the notes of 'r-1' (namely, C3, D3, E3, F3, G3, A3, and B3), to be output to 'Synth1' through 'Synth7', respectively.

With "no keys being initially pressed" as the starting condition, 'Key1' 120 through 'Key7' 132 each outputs a value of 'Stop' (logical 0) to 'Synth1' through 'Synth7', respectively, a value of logical 0 to the 7-input 'OR', and a 'Y' value of 'OFF' to the 'Analyzer'. As a result, the output of the 7-input 'OR' is set to a value of logical 0, and the output of the rising edge 'Delay' is set to a value of 'Disable' (logical 0) for the 7 synths, all of which are stopped and disabled from playing due to the values of 'Stop' and 'Disable' being input.

Pressing 'Key3' 124 causes it to then output a value of 'Play' (logical 1) to Synth3', which is currently loaded with a 'Note' of value 'E3', but it is also disabled, so it does not yet start playing. The 'Key3' 124 press also causes it to output a value of logical 1 to the 7-input 'OR', and to output the 'Y' value of the pressed point along that key to the 'Analyzer', which then internally latches the 'Y' value as the 'Y0' of 'Key3' 124, for comparison with future 'Y' values from 'Key3' 124. Upon its logical 1 input, the 7-input 'OR' outputs a value of logical 1, which triggers the rising edge 'Delay' to output a value of 'Enable' (logical 1) after a brief delay.

Additionally pressing 'Key5' 128 and 'Key7' 132 within the delay time interval causes each key to output a value of 'Play' to 'Synth5' and 'Synth7', respectively, each of which is currently loaded with a 'Note' of value 'G3' and 'B3', respectively, but they are also both disabled, so they do not yet start playing. The 'Key5' 128 and 'Key7' 132 presses also cause each key to output a value of logical 1 to the 7-input 'OR', and to additionally output the 'Y' value of its press to the 'Analyzer', which then internally latches that 'Y' value as the 'Y0' of that key, for comparison with future 'Y' values from that key.

If no other keys are pressed before the delay time interval has expired, upon expiration of such, the rising edge 'Delay' outputs a value of 'Enable' to each synth, which triggers the immediate latching and start of playing of notes 'E3', 'G3', and 'B3' corresponding to 'Synth3', 'Synth5', and 'Synth7', respectively, since those are the only synths inputting a 'Play' value from their corresponding key. This effectively plays an E minor chord.

Alternatively, if the pressing of 'Key1' 120 (at a 'Y' value corresponding to 'r-8') also occurs before the delay time interval has expired, this causes 'Key1' 120 to output a value of 'Play' to 'Synth1', which is currently loaded with a 'Note' of value 'C3', but it is also disabled, so it does not yet start playing. The 'Key1' 120 press also causes the key to output a value of logical 1 to the 7-input 'OR', and to output the 'Y' value of its press to the 'Analyzer', which internally latches that 'Y' value as the 'Y0' of that key, for comparison with future 'Y' values from that key, and which then outputs a 'Row' value of 'r-8' based on the 'Y' value output by 'Key1' 120. The 'Row' value 'r-8' causes notes 'C4', 'D4', 'E4', 'F4', 'G4', 'A4', and 'C5' to be output to 'Synth1' through 'Synth7', respectively, which are all disabled, so no playing occurs. Once the delay time interval has expired, the rising edge 'Delay' outputs a value of 'Enable' to all synths, which then triggers the immediate latching and start of playing of the notes 'C4', 'E4', 'G4', and 'C5' corresponding to 'Synth1', 'Synth3', 'Synth5', and 'Synth7', respectively, since those are the only synths inputting a 'Play' value from their corresponding key. This effectively plays a C Major chord, with a root note of C4, and a doubling of the root note at C5.

While a key is being pressed, the 'Y' value of the pressed point along the key is continually updated and output to the 'Analyzer', where it is compared with the 'Y0' value latched for that key when it was initially pressed, and a 'Pitch Control' value 'Y-Y0' is output to the corresponding synth to control its pitch, thus providing a pitch modulation effect, similar to that of a guitar string bend, string slide, or whammy bar, which can be accomplished simply by sliding one's finger up and down along the key being pressed with that finger.

When a key is released (possibly 'Key1' 120), the output to its corresponding synth is set to a value of 'Stop, and if any key remains pressed, such that the 7-input 'OR' output is still set to logical 1, and the rising edge 'Delay' output is still set to 'Enable', thereby causing all synths to remain enabled, and playing if their corresponding key is pressed, then the synth corresponding to the released key is immediately stopped from playing. Further, the 'Y' output of the released key going to the 'Analyzer' is set to 'OFF'. If the released key is, in fact, 'Key1', the Y0 value for 'Key1' remains latched internally to the 'Analyzer', so the 'Row' output from the 'Analyzer' remains unchanged.

If a new key (other than 'Key1' 120) is pressed before all keys have been released, such that the 7-input 'OR' output is still set to logical 1 and the rising edge 'Delay' output is still set to 'Enable', then the output to its corresponding synth is set to a value of 'Play', and its output to the 7-input 'OR' is set to a logical 1, which causes the synth to latch and start playing the 'Note' corresponding to the newly pressed key, as determined by the current 'Row' value from the 'Analyzer', and by the column assignment of the pressed key.

If 'Key1' 120 had been released, and is newly pressed (at a 'Y' value corresponding to 'r-3') before all keys have been released, such that the 7-input 'OR' output is still set to logical 1, and the rising edge 'Delay' output is still set to 'Enabled', that 'Y' value is output to the 'Analyzer', where it is internally latched as the 'Y0' of 'Key1', for comparison with future 'Y' values from 'Key1' 120. At this same time, the 'Analyzer' outputs the corresponding 'Row' value of 'r-3', thereby causing that row of notes 'E3', 'F3', 'G3', 'A3', 'B3', 'C4', and 'D4' to be output to 'Synth1' through 'Synth7', respectively, immediately after which the 'Key1' 120 output to the already enabled 'Synth1' is set to a value of 'Play', thus causing 'Synth1' to latch its loaded 'Note' of value 'E3' and start playing it. The remaining synths whose corresponding keys are pressed, namely, 'Synth3', 'Synth5', and 'Synth7', continue playing their previously latched notes.

The 'Row' value of 'r-3' remains in effect until the next new 'Key1' 120 press. Thus, by newly pressing the same keys as before, namely, 'Key1' 120 (but now at a new 'Y' value corresponding to 'r-3', rather than 'r-8'), 'Key3' 124, 'Key5' 128, and 'Key7' 132, what previously played a modified C Major chord, now plays an E minor 7th.

When all keys have been released, the outputs of 'Key1' 120 through 'Key7' 132, being input to 'Synth1' through 'Synth7', respectively, are reset to a value of 'Stop', which stops from playing any synth that had been playing just prior to the release, and the 'Y' outputs of 'Key1' 120 through 'Key7' 132, being input to the 'Analyzer', are reset to OFF, which then leaves the 'Row' output of the 'Analyzer' unchanged, such that subsequent key presses would be evaluated by restarting this logic from the "no keys being initially pressed" condition, but now beginning with the current 'Row' value being output from the 'Analyzer'.

Figure 5:
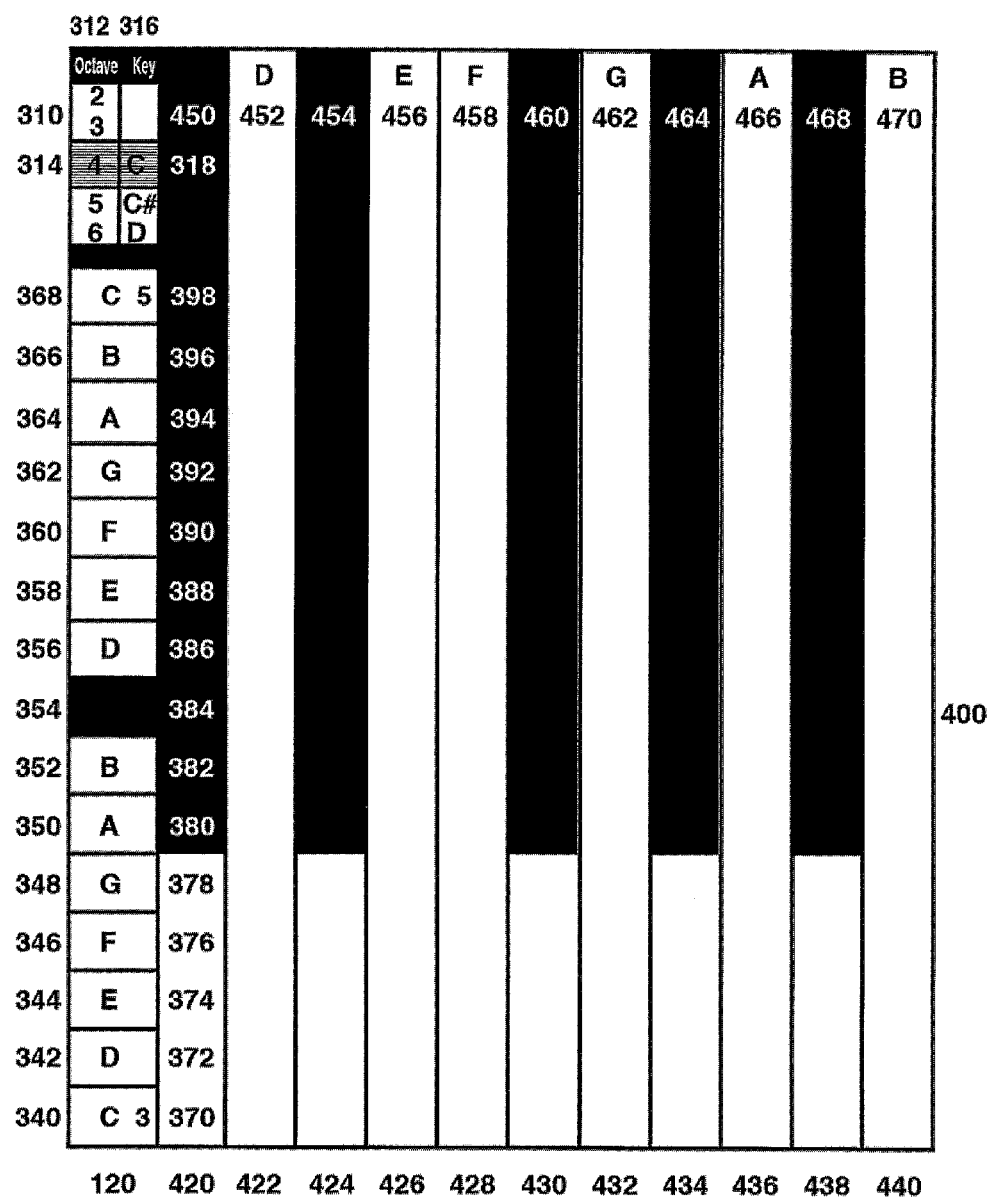
FIG. 5 is a top view of a second embodiment of an iPad, piano-type, touchscreen keyboard.

A second embodiment of the above iPad, piano-type, touchscreen keyboard of the invention is shown in FIG. 5, and is designated generally as 400. This keyboard 400 has attributes nearly identical to those of the above keyboard 300 in FIGS. 1, 2, and 3; however, it is comprised of 11, non-sectioned, black and white keys 420, 422, 424, 426, 428, 430, 432, 434, 436, 438, and 440 in place of the 6 such white keys 322, 324, 326, 328, 330, and 332 of the above keyboard 300.

The 11 black and white keys 420, 422, 424, 426, 428, 430, 432, 434, 436, 438, and 440 are equal to the length and 6/11 the width of the above replaced white keys 322, 324, 326, 328, 330, and 332 in FIGS. 1, 2, and 3. The 11 black and white keys 420, 422, 424, 426, 428, 430, 432, 434, 436, 438, and 440 are further color coordinated with the 11 black and white keys immediately following a C-key on a standard piano keyboard. As such, the operation of the first white key 120 and of the pop-up data picker 310 are as described for the above keyboard 300, and the corresponding notes 384, 450, 452, 454, 456, 458, 460, 462, 464, 466, 468, and 470 of the total of 12 black and white keys 120, 420, 422, 424, 426, 428, 430, 432, 434, 436, 438, and 440 are the 12-note sequence of notes (C4-C#-D-D#-E-F-F#-G-G#-A-A#-B) on a standard piano keyboard starting with the note (C4) 384 of the last touched section 354 of the first white key 120.

In this manner, with just a single octave of keys, a 3-octave keyboard can be implemented in a footprint the size of an iPad screen, while retaining the full key size and basic functionality of a standard piano keyboard, and enabling all chords of a specific chord type, regardless of their root note, to be played using just the finger position of a C-chord of that chord type, thereby greatly simplifying all chord playing. This keyboard can also be configured to substitute a chord inversion or alternate chord voicing when a standard, root-position chord is pressed, so as to further simplify the playing of chords. As would be obvious to one skilled in the art, many other configurations and footprints are possible.

Figure 6:
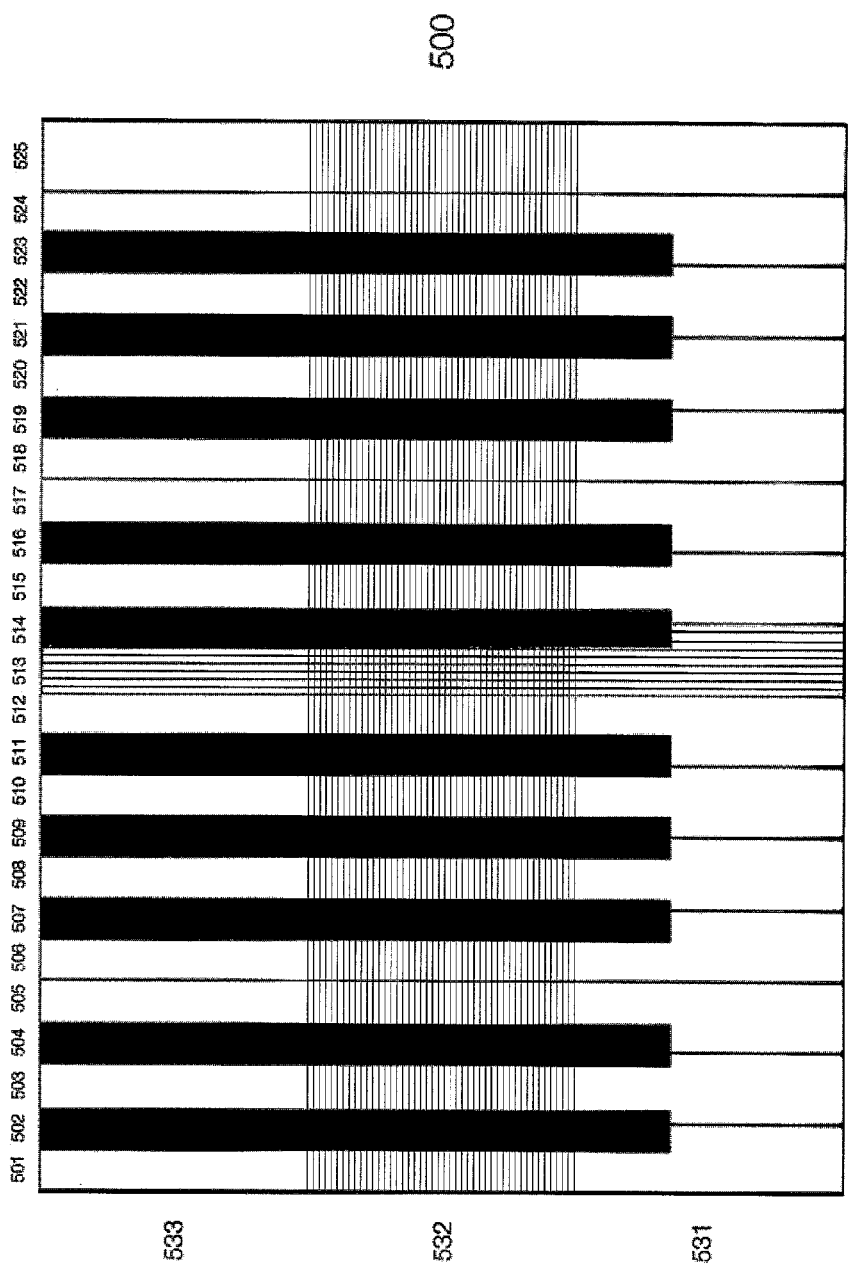
FIG. 6 is a top view of a third embodiment of an iPad, piano-type, touchscreen keyboard.

A third embodiment of the above iPad, piano-type, touchscreen keyboard of the invention is shown in FIG. 6, and is designated generally as 500. This keyboard 500 is comprised of a combination of 25, piano-sized, black and white keys 501 to 525, arranged in a layout typical of the two-octave span of keys centered around middle C (C4) on a standard piano. The keys 501 to 525 are each divided lengthwise into three touch sensor bands 531 to 533 that span the full width of the keyboard 500, such that, when the keys 501 to 525 are progressively pressed from a touch point within their middle band 532, their corresponding notes will range from C3 to C5, respectively; however, when the keys 501 to 525 are so pressed from a touch point within their bottom band 531 or top band 533, their corresponding notes will range from C2 to C4 or C4 to C6, respectively.

In this manner, using 2 octaves of keys, a 4-octave keyboard can be implemented in a footprint the size of an iPad Pro screen, while retaining the full key size and much of the functionality and the playability of a standard piano keyboard. As would be obvious to one skilled in the art, many other configurations and footprints are possible.

Figure 7:
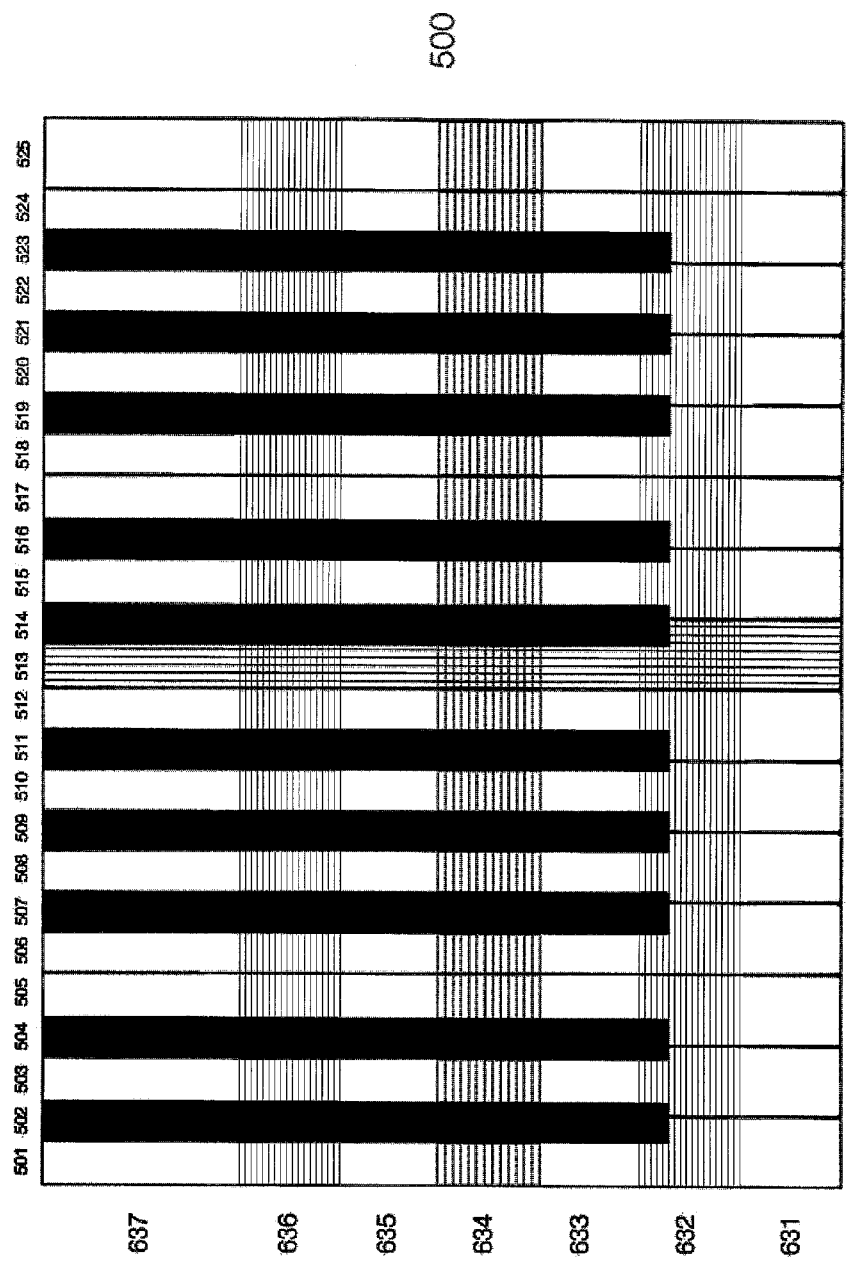
FIG. 7 is a top view of a fourth embodiment of an iPad, piano-type, touchscreen keyboard.

A fourth embodiment of the above iPad, piano-type, touchscreen keyboard of the invention is shown in FIG. 7, and is designated generally as 600. In a manner very similar to the above keyboard 500 in FIG. 6, this keyboard 600 is comprised of a two-octave span of 25 keys 501 to 525; however, instead of the three touch sensor bands 531 to 533 of the above keyboard 500, the keys 501 to 525 are divided lengthwise into seven, more narrow, touch sensor bands 631 to 637 that operate similarly to the three touch sensor bands 531 to 533, so as to determine the octave of the corresponding note that is played whenever a key is pressed from a specific band.

However, playing a chord or arpeggio would be very difficult if all keys in such a series had to be pressed from within a single narrow band. Therefore, whenever such a series of key presses is initiated, the first band that is touched remains in effect until all the keys 501 to 525 have been released and remain so for a brief period of time, typically on the order of 0.1 to 0.5 seconds, so that all notes in a given series, regardless of from which of the touch sensor bands 631 to 637 they were pressed, can be played with the same band in effect, and when a new series of key presses is initiated, another of the touch sensor bands 631 to 637 can take effect.

In this manner, again using 2 octaves of keys, an 8-octave keyboard can now be implemented in a footprint the size of an iPad Pro screen, while retaining the full key size, and virtually all of the functionality and playability, of a standard piano keyboard, but now, with an even wider note span (97 notes vs. 88 notes) than that of a piano. As would be obvious to one skilled in the art, many other configurations and footprints are possible.

A fifth embodiment of the above iPad, piano-type, touchscreen keyboard of the invention is shown in FIGS. 8 to 13, and is designated generally as 700. This keyboard 700 is comprised of a combination of 17, piano-sized, black and white keys 701 to 717, being arranged in a layout typical of a 17-key span starting from any C key on a standard piano. Two white keys 701 and 713 are respectively outfitted with GUI radio button assemblies 720 and 750, each respectively sectioned lengthwise into 22, mutually exclusive (in radio button fashion), touch sensors 721 to 742 and 751 to 772. These two radio button assemblies 720 and 750 are themselves mutually exclusive, such that there can be only one touch sensor 721 to 742 or 751 to 772 in effect at any given time.

Figure 8:
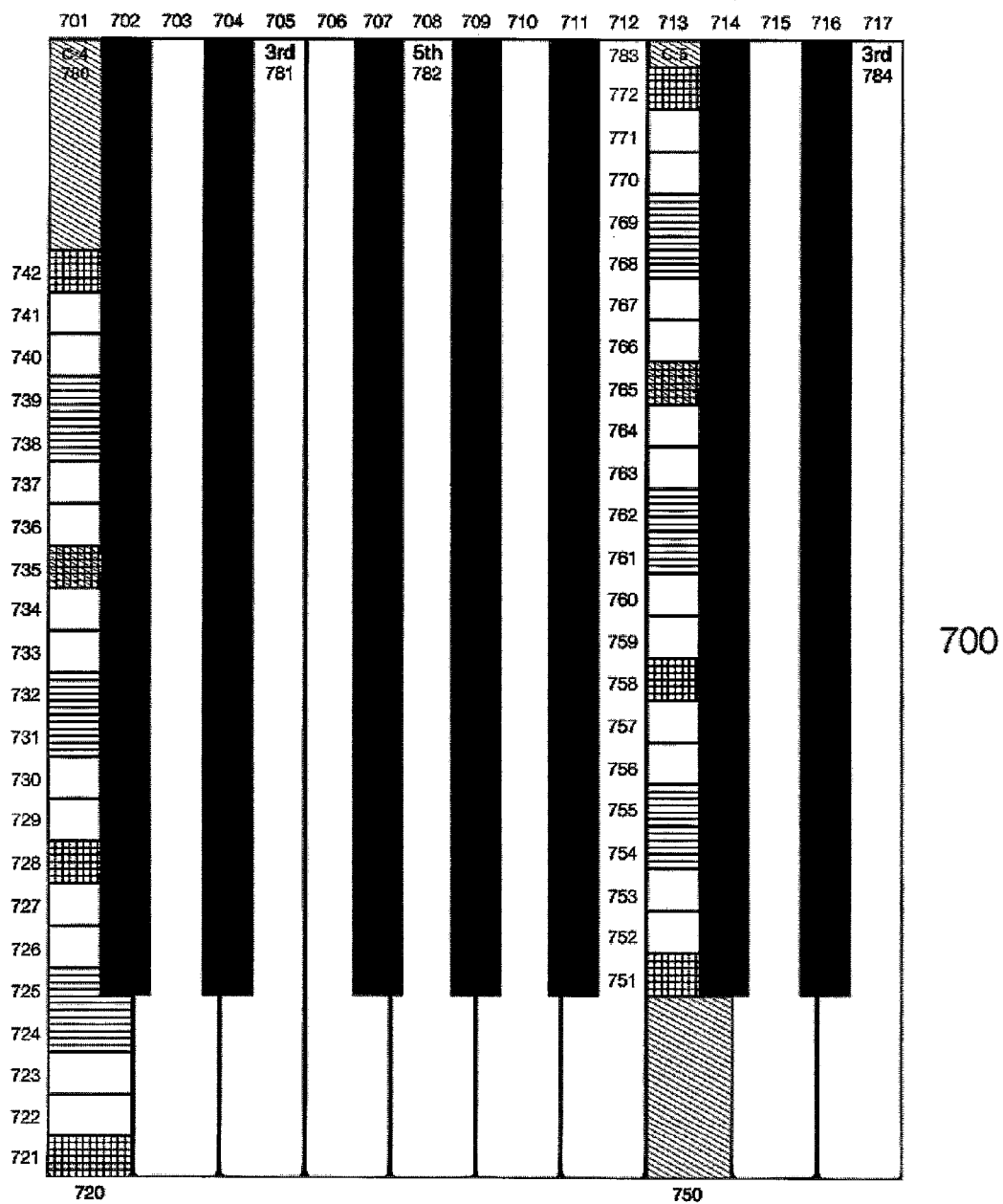
FIG. 8 is a top view of a first operational state of a fifth embodiment of an iPad, piano-type, touchscreen keyboard.

FIG. 8 shows none of the keys 701 to 717 of the above keyboard 700 currently being pressed. As such, if either touch sensor outfitted key 701 or 713 were progressively pressed from within each of its touch sensors 721 to 742 or 751 to 772, respectively, starting from its bottom touch sensor 721 or 751, respectively, and progressing to its respective top touch sensor 742 or 772, the respective corresponding notes for that key 701 or 713 would range from C2 to C5 or C3 to C6. Furthermore, each time a new touch sensor 721 to 742 or 751 to 772 comes into effect, the left touch sensor outfitted key 701 will be configured for that associated note, and the remaining keys 702 to 717 will be immediately reconfigured from that note in accordance with the notes of a standard piano.

Figure 9:
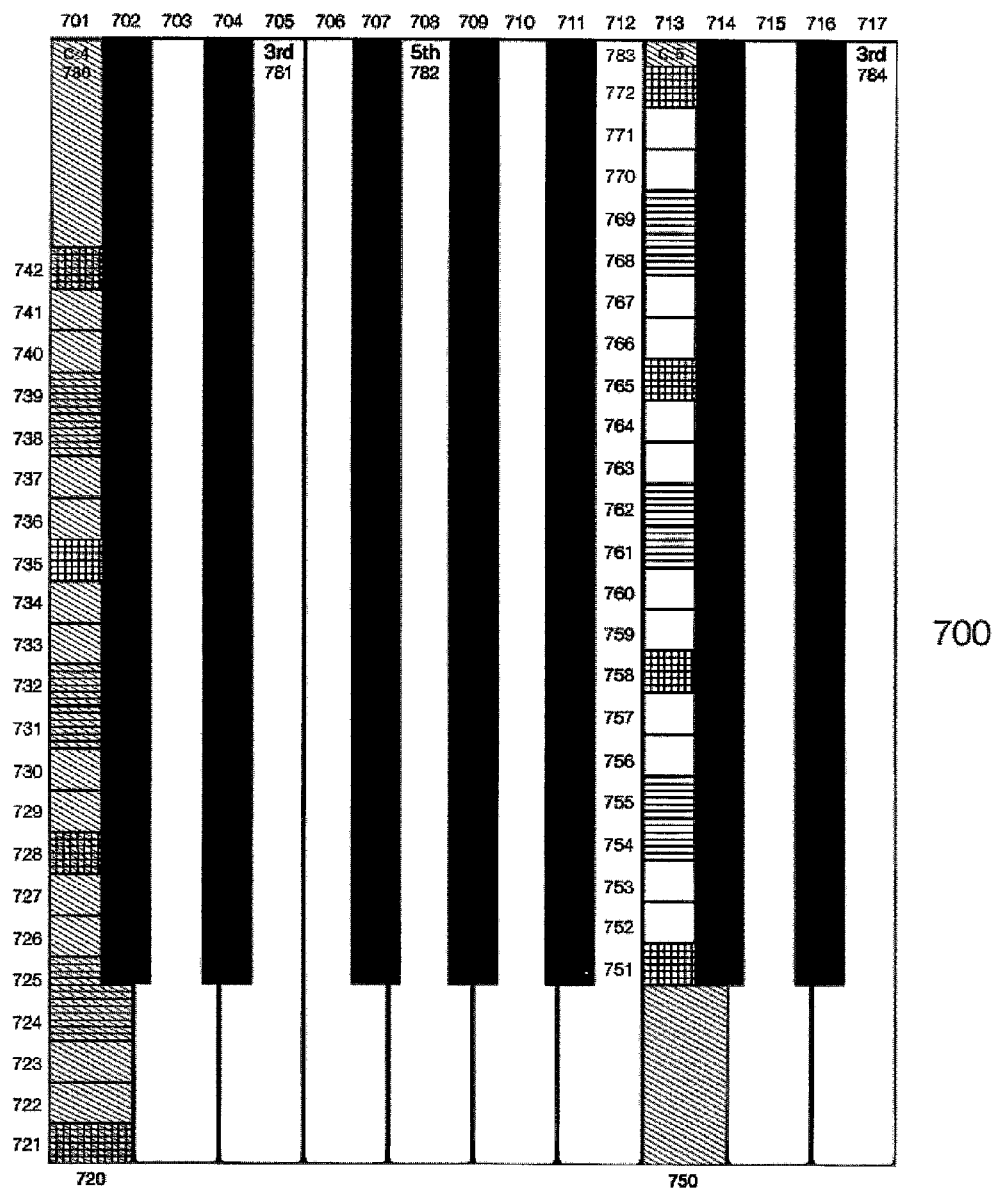
FIG. 9 is a top view of a second operational state of the fifth keyboard embodiment shown in FIG. 8.

FIG. 9 shows the left touch sensor outfitted key 701 being pressed from its C4 touch sensor 735 (as indicated by the highlighting of that key 701 and the unhighlighting of that touch sensor 735), which configures the corresponding note of the key 701 for C4 (as indicated by the display 780 at the top of the key 701), and reconfigures the corresponding notes of all keys 701 to 717 for the notes C4 to E5. This configuration remains in effect until the left touch sensor outfitted key 701 is released, and a different touch sensor 721 to 742 or 751 to 772 is subsequently pressed.

Figure 10:
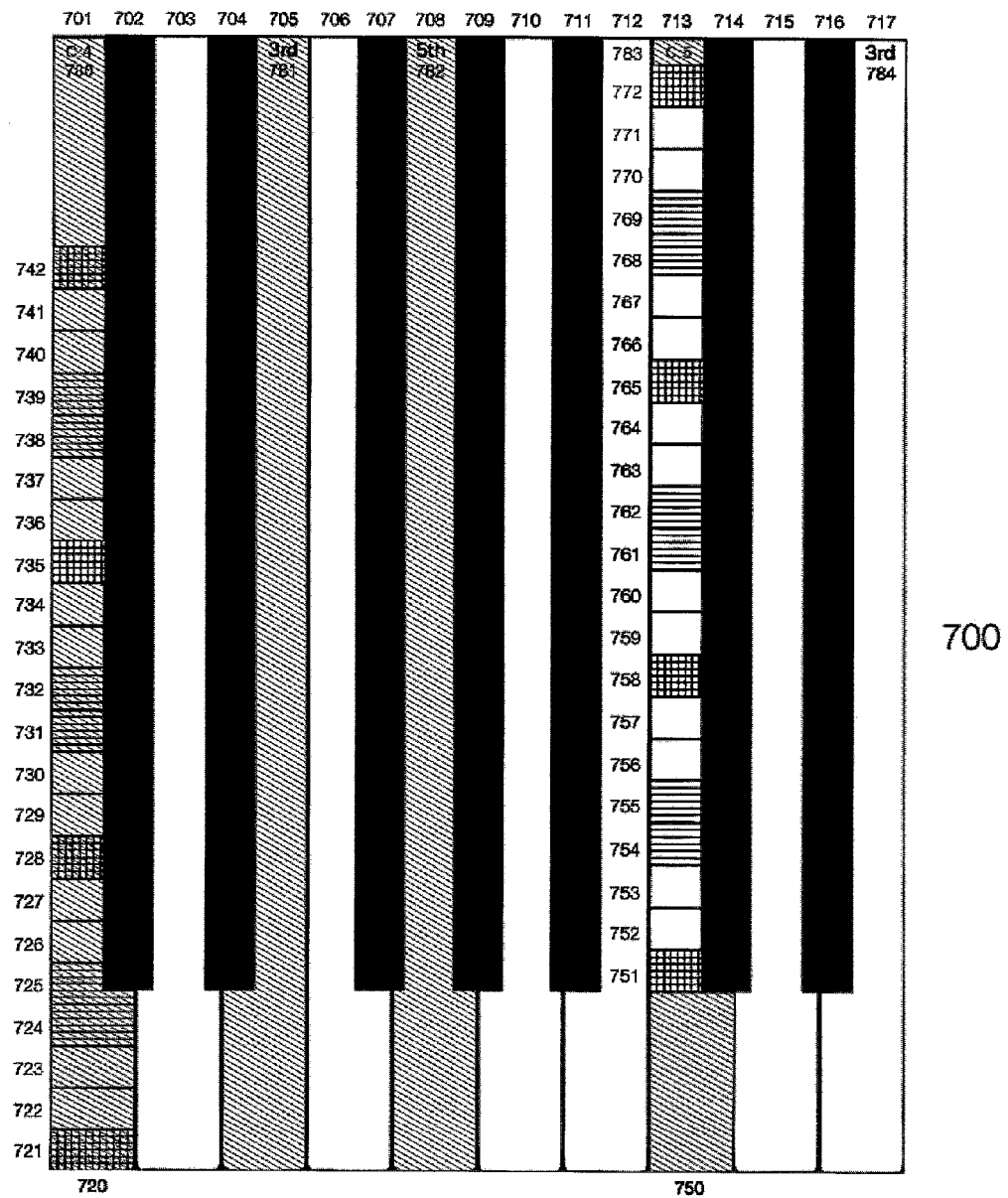
FIG. 10 is a top view of a third operational state of the fifth keyboard embodiment shown in FIGS. 8 and 9.

FIG. 10 shows a root position C Major chord being pressed (as indicated by the 3 highlighted keys 701, 705, and 708). The left touch sensor outfitted key 701 is being pressed from its C4 touch sensor 735 (as indicated by that touch sensor 735 being unhighlighted), which configures the corresponding note of the key 701 for the chord root note C4, and respectively reconfigures the corresponding notes of the 2 remaining pressed keys 705 and 708 for the notes E4 and G4, being located a 3rd and 5th, respectively, above C4 (as respectively indicated by the 2 labels 781 and 783 at the top of those keys 705 and 708).

Figure 11:
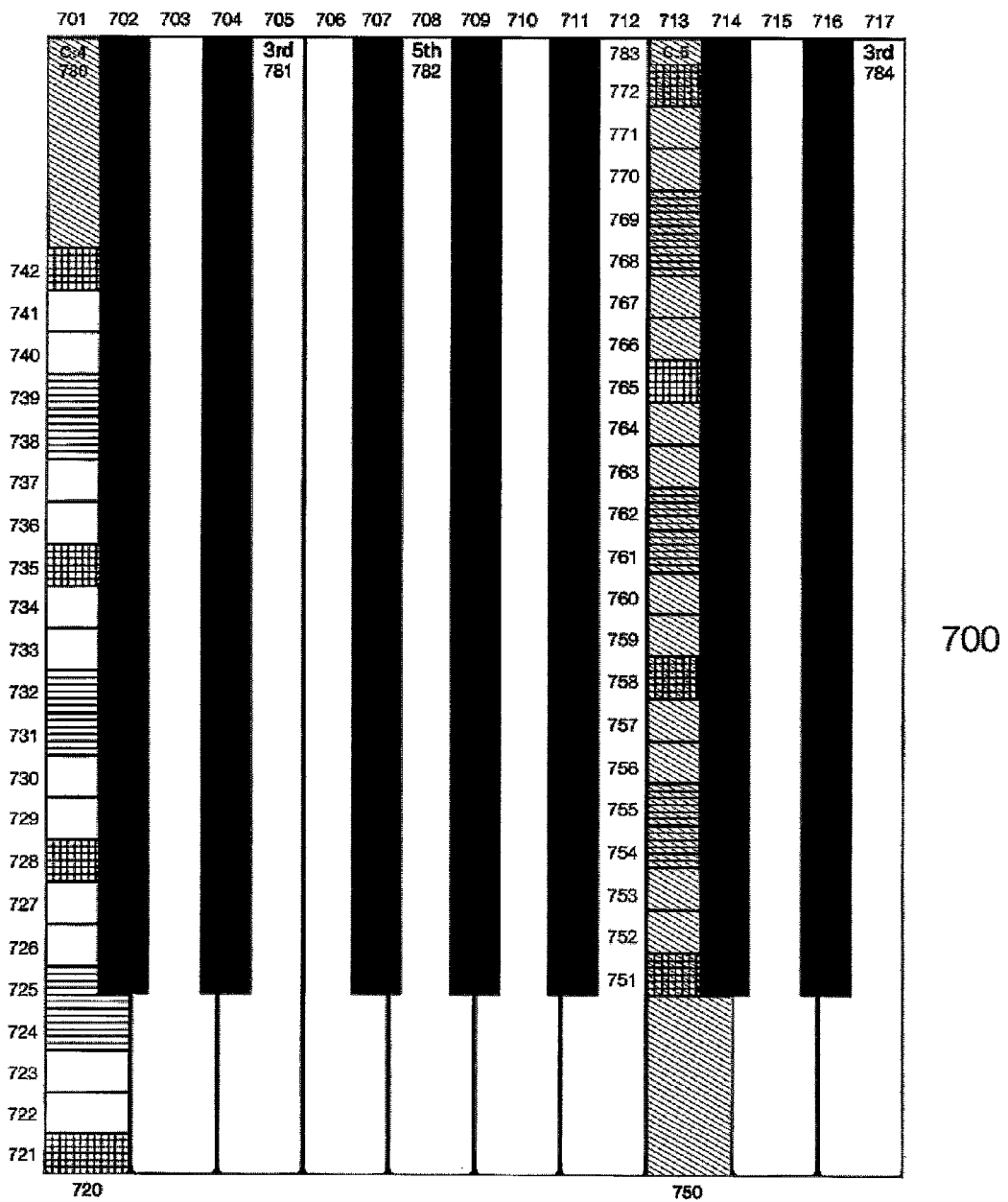
FIG. 11 is a top view of a fourth operational state of the fifth keyboard embodiment shown in FIGS. 8 to 10.

FIG. 11 shows the right touch sensor outfitted key 713 being pressed from its C5 touch sensor 765 (as indicated by the highlighting of that key 713 and the unhighlighting of that touch sensor 765), which configures the corresponding note of the key 713 for C5 (as indicated by the display 783 at the top of the key 713), and reconfigures the corresponding notes of all keys 701 to 717 for the notes C4 to E5. This configuration remains in effect until the right touch sensor outfitted key 713 is released, and a different touch sensor 721 to 742 or 751 to 772 is then subsequently pressed.

Figure 12:
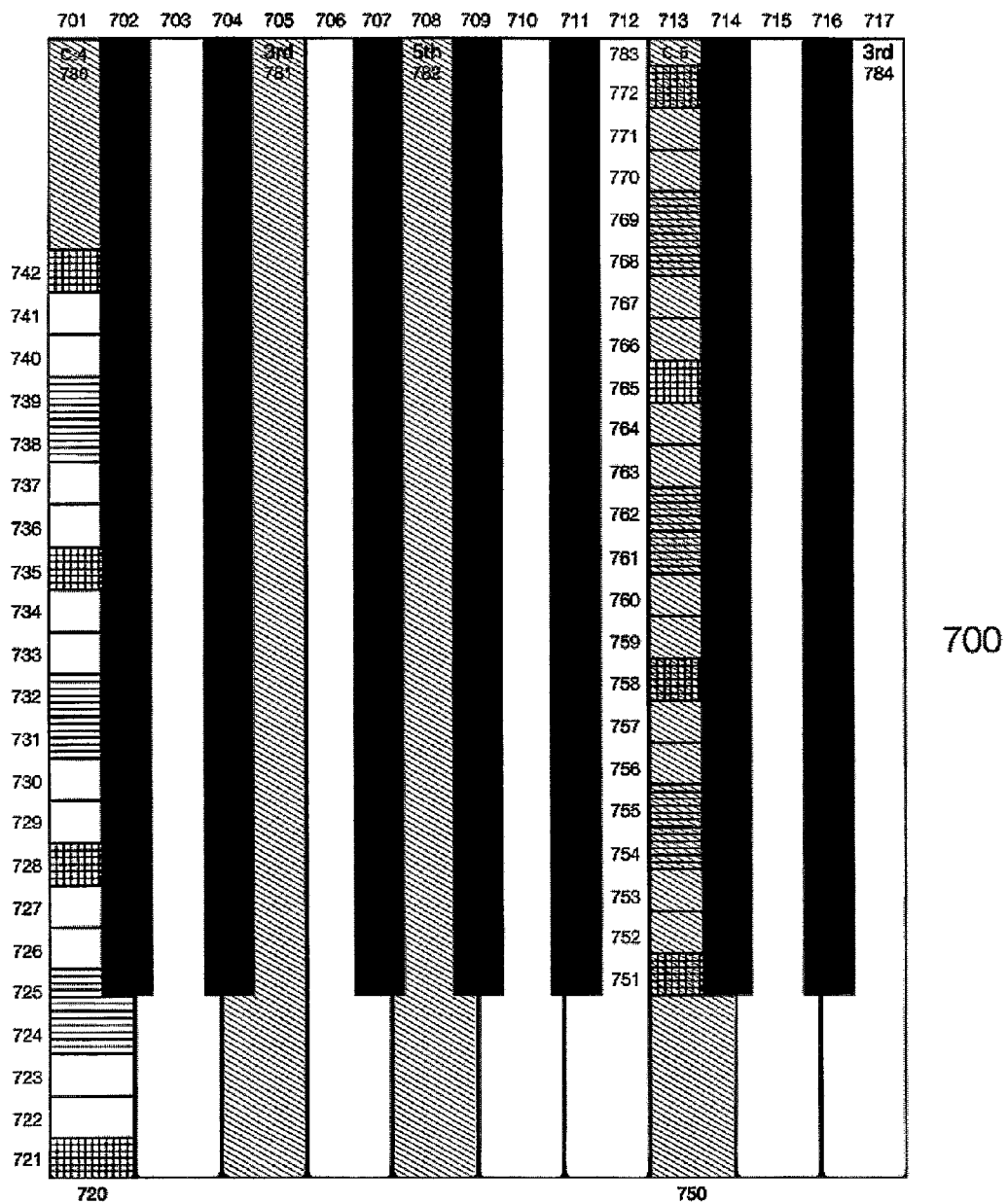
FIG. 12 is a top view of a fifth operational state of the fifth keyboard embodiment shown in FIGS. 8 to 11.

FIG. 12 shows a 1st inverted C Major chord being pressed (as indicated by the 3 highlighted keys 705, 708, and 713). The right touch sensor outfitted key 713 is being pressed from its C5 touch sensor 765 (as indicated by that touch sensor 765 being unhighlighted), which configures the corresponding note of the key 713 for the 1st inverted chord root note C5, and respectively reconfigures the corresponding notes of the 2 remaining pressed keys 705 and 708 for the notes E4 and G4, being located a 3rd and 5th, respectively, above C4 (as respectively indicated by the 2 labels 781 and 783 at the top of those keys 705 and 708).

Figure 13:
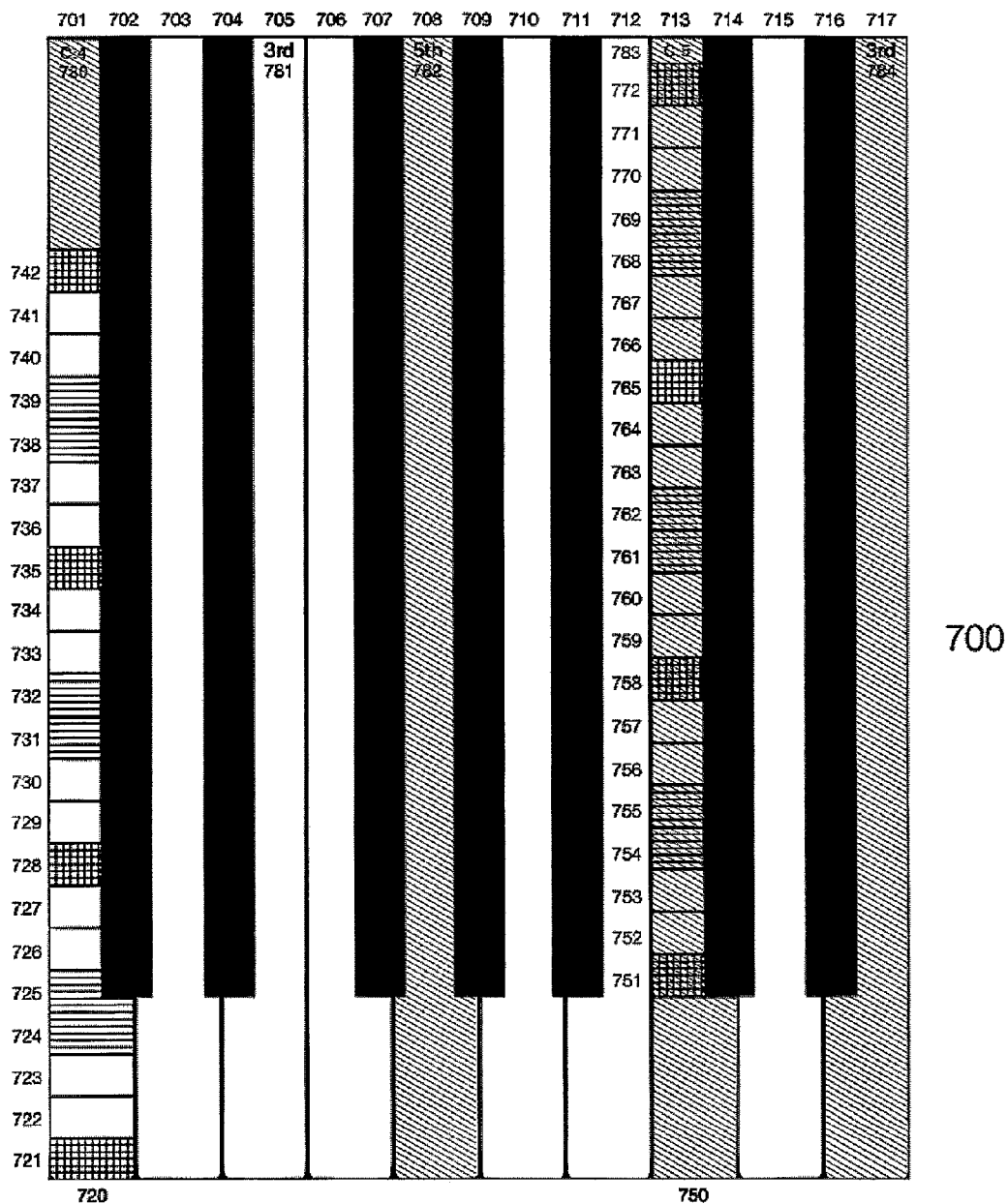
FIG. 13 is a top view of a sixth operational state of the fifth keyboard embodiment shown in FIGS. 8 to 12.

FIG. 13 shows a 2nd inverted C Major chord being pressed (as indicated by the 3 highlighted keys 708, 713, and 717). The right touch sensor outfitted key 713 is being pressed from its C5 touch sensor 765 (as indicated by that touch sensor 765 being unhighlighted), which configures the corresponding note of the key 713 for the 2nd inverted chord root note C5, and respectively reconfigures the corresponding notes of the 2 remaining pressed keys 708 and 717 for the notes G4 and E5, located a 5th above C4 and a 3rd above C5, respectively (as respectively indicated by the 2 labels 781 and 783 at the top of those keys 708 and 717, respectively).

As follows from the above discussions for FIGS. 8 to 13, with just 17 keys, a 53-note keyboard can be implemented in a footprint the size of an iPad Pro screen, while retaining the full key size and basic functionality of a standard piano keyboard, as well as enabling all chords of a specific chord type, regardless of their root notes, to be played using just the finger position of a C-chord of that chord type, and further enabling chord inversions to be based around their root notes, so as to substantially simplify all chord playing. As would be obvious to one skilled in the art, many other configurations and footprints are possible.

Figure 14:
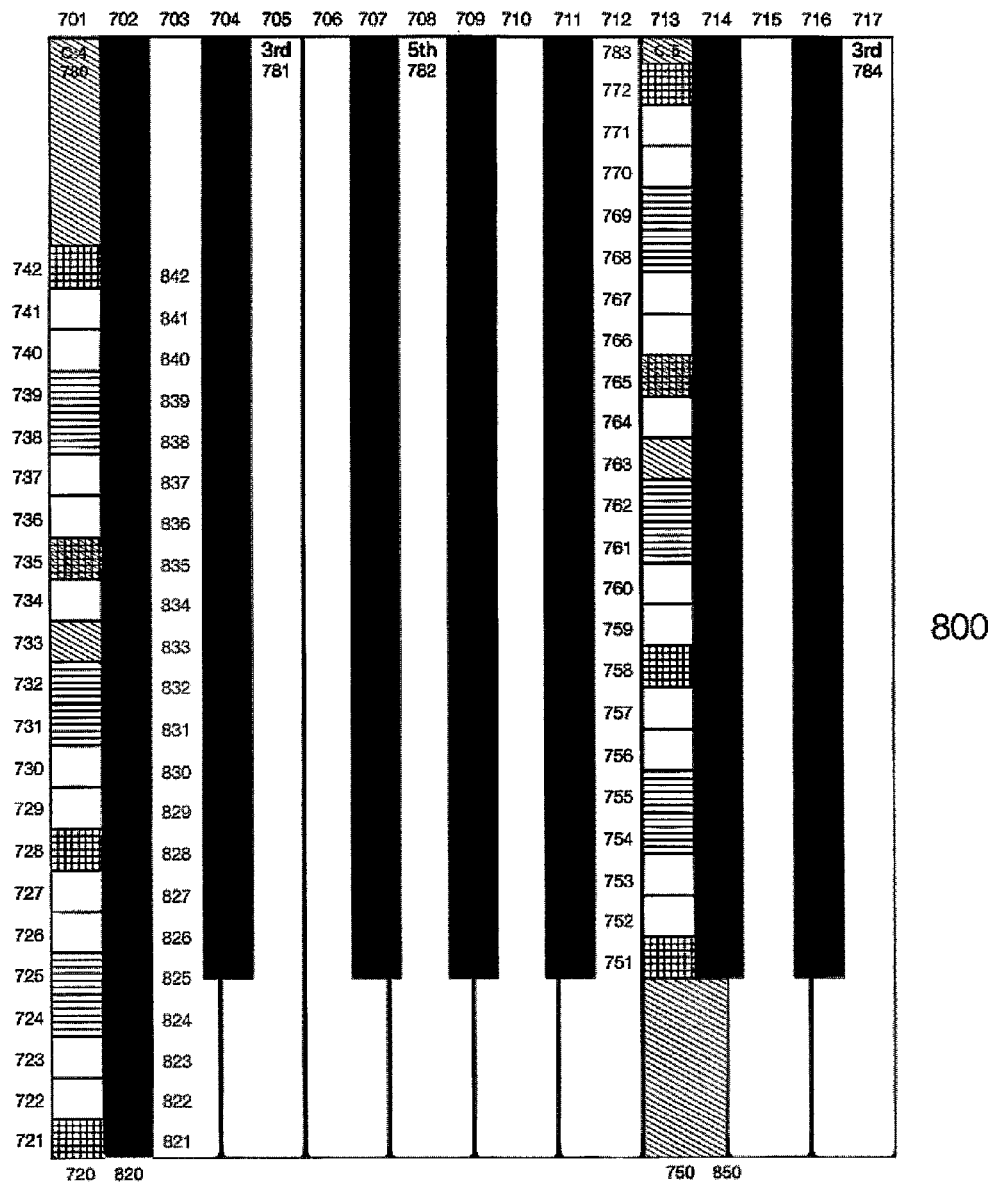
FIG. 14 is a top view of a sixth embodiment of an iPad, piano-type, touchscreen keyboard.

A sixth embodiment of the above iPad, piano-type, touchscreen keyboard of the invention is shown in FIG. 14, and is designated generally as 800. This keyboard 800 is virtually identical in both its form and function to the above keyboard 700 in FIGS. 8 to 13, except for the fact that two black keys 702 and 714 of this keyboard 800 are each sectioned lengthwise into 22 touch sensors 821 to 842 and 851 to 872, respectively. The notes associated with each of the touch sensors 821 to 842 and 851 to 872 are respectively one semitone higher than the associated notes of the adjacent touch sensors 721 to 742 and 751 to 772 in FIG. 14, such that, if the two touch sensor outfitted black keys 702 and 714 were progressively pressed from within each of their touch sensors 821 to 842 and 851 to 872, respectively, starting from their bottom touch sensors 821 and 851, respectively, and progressing to their top touch sensors 842 and 872, respectively, their corresponding notes would respectively range from C#2 to C#5 and C#3 to C#6.

In this manner, similar to the previously mentioned keyboard 700, with just 17 piano-sized keys 701 to 717, the 53-note span, C2 to E6, can be implemented in a footprint the size of an iPad Pro screen, while enabling all chords of a specific chord type, regardless of the chord root note, to be played with just a single finger position, namely, that of a C-chord of that type, which is even easier than on a standard piano keyboard. As would be obvious to one skilled in the art, many other configurations and footprints are possible.

Furthermore, in view of the additional touch sensor outfitted keys 702 and 714, knowing the finger position for a relatively easily played chord having a natural root note (e.g., the C Major chord), makes it a simple matter to play the corresponding, more difficult to play, chord with its root note sharpened by one semitone (e.g., the C# Major chord), just by maintaining that finger position and shifting the entire playing hand one semitone to the right, which is exactly how it would be done on a standard piano.

Figure 15:
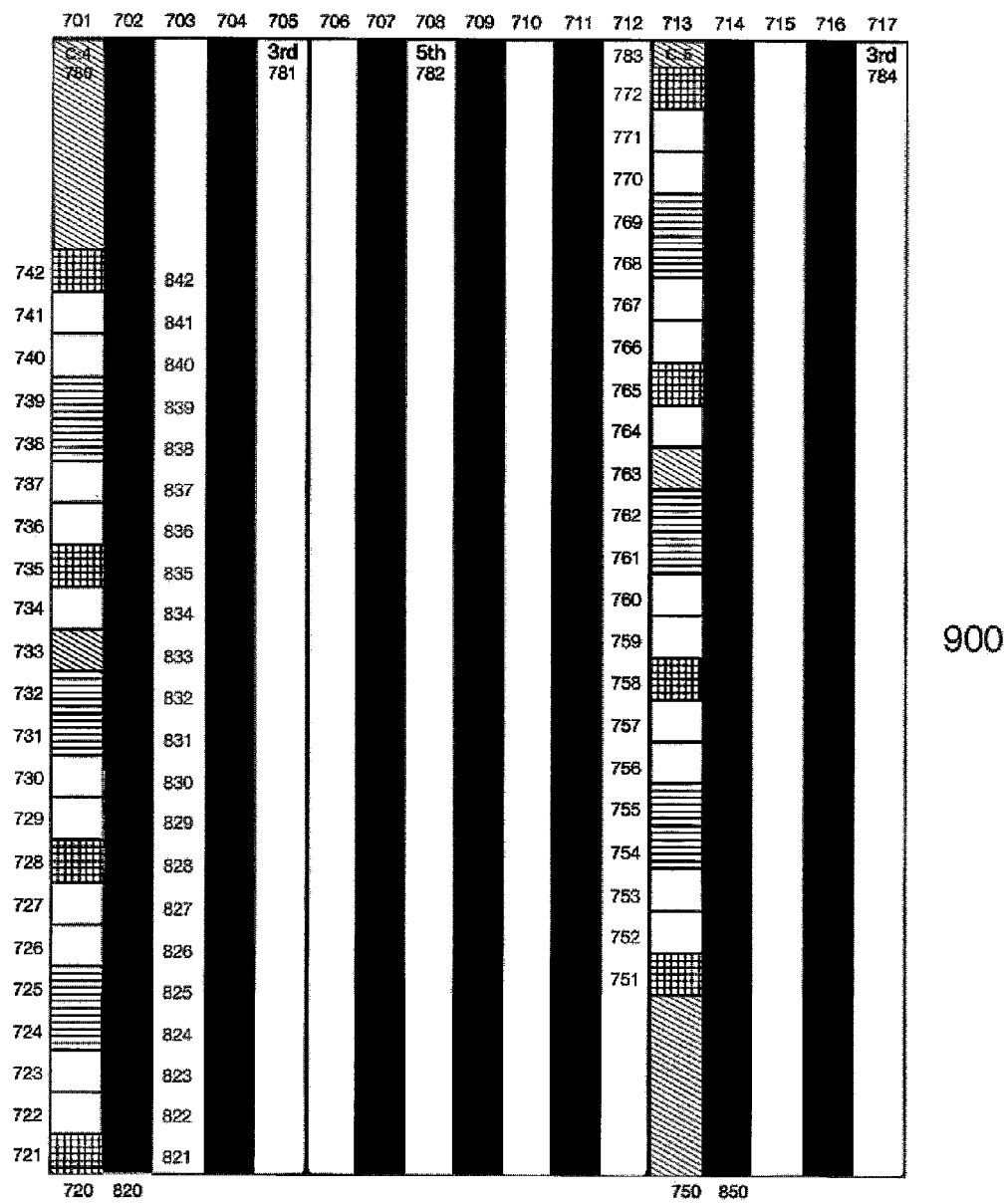
FIG. 15 is a top view of a seventh embodiment of an iPad, piano-type, touchscreen keyboard.

A seventh embodiment of the above iPad, piano-type, touchscreen keyboard of the invention is shown in FIG. 15, and is designated generally as 900. This keyboard 900 is virtually identical in both its form and function to the above keyboard 800 in FIG. 14, except for the fact that all keys 701 to 717 of this keyboard 900 are of both equal length and equal width. In view of this added keyboard 900 uniformity, the above mentioned one-semitone hand shifts would now be perfectly uniform transitions, regardless of the actual chord, which is even easier than can be done on a standard piano.

Figure 16:
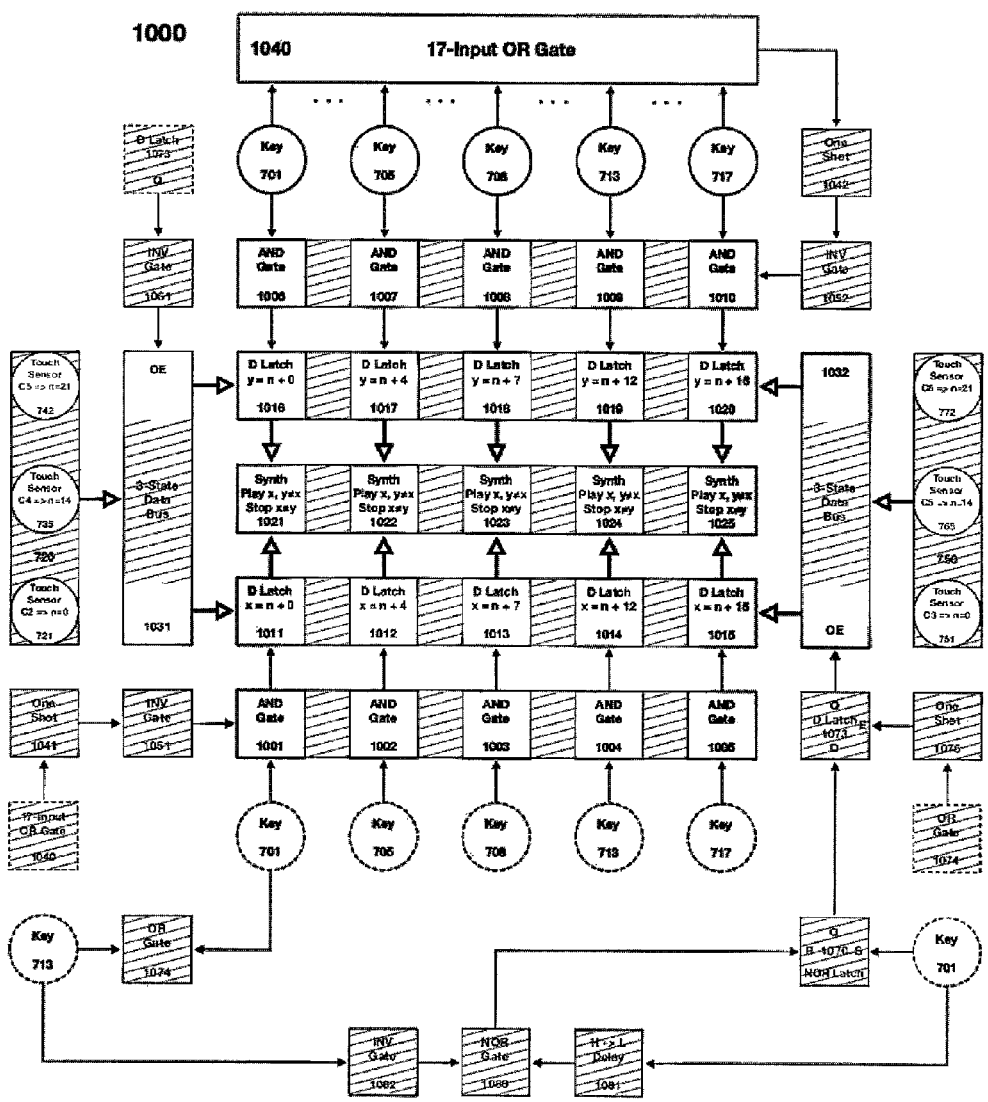
FIG. 16 is a logic diagram of the fifth keyboard embodiment shown in FIGS. 8 to 13.

A logic diagram for the above keyboard 700 is shown in FIG. 16, and is designated generally as 1000. This logic diagram 1000 uses black-filled arrow tips to designate logic flow along a single wire, and white-filled arrow tips to designate data flow along a multi-wire bus. To minimize the logic diagram 1000 complexity, some multi-function logic elements have been copied to multiple logic diagram 1000 locations, and such copies are indicated by their dashed border. To further minimize the logic diagram 1000 complexity, only five keys 701, 705, 708, 713, and 717 of the keyboard 700 keys 701 to 717 are shown. The missing keys 702, 703, 704, 706, 707, 709, 710, 711, 712, 714, 715, and 716, as well as their connected logic circuits, are indicated by an ellipsis ( . . . ) placeholder between each of the shown keys 701, 705, 708, 713, and 717. Furthermore, for each of the touch sensor outfitted keys 701 and 713, only three touch sensors, 721, 735, and 742, and 751, 765, and 772, respectively, of their total touch sensors 721 to 742 and 751 to 772, respectively, are shown.

Whenever one of the keyboard 700 keys 701 to 717 is pressed, its corresponding note will play as configured according to which of the touch sensor sections 721 to 742 and 751 to 772 is in effect at that time. Whenever a chord is played, if its root note is played from the associated touch sensor 721 to 742 or 741 to 772 of a respective touch sensor outfitted key 701 or 713, all keys 701 to 717 will then configured correctly for that chord. However, since all keys of a chord are not pressed at precisely the same time, it is likely that the touch sensor outfitted key 701 or 713 would not be the first chord key pressed, such that the actual, first-pressed chord key would then be incorrectly configured for the desired chord.

As such, if the first-pressed chord key were sounded with an incorrect corresponding note, and then, when a touch sensor outfitted key 701 or 713 is pressed, stopped and resounded with the correct corresponding note, noise will result. Furthermore, depending on the length of time the incorrect note has been sounded before being stopped, that noise could become objectionable. Therefore, it is necessary to delay the sounding of any pressed chord keys until a brief period of time after the first chord key has been pressed, thereby allowing enough time for all chord keys to become pressed in the normal playing of a chord, so that the pressed keys can be configured for the correct corresponding notes of that chord before they are sounded.

The problem with such a delay is that it will cause a lag in the note sounding, and depending on the magnitude of the delay time, the lag could become noticeable, and even more objectionable than the noise problem. Both of these problems are addressed in the following example.

Returning now to the logic diagram 1000, suppose that the keyboard 700 is initially configured with the C4 (middle C) touch sensor 735 of the left touch sensor outfitted key 701 in effect. As such, the keyboard 700 keys 701 to 717 would be configured for the corresponding notes C4 to E5, respectively.

However, suppose it were now desired to play a C5 Major chord (C5-E5-G5). Since none of the keys 701 to 717 are currently configured for a corresponding note G5, the keyboard 700 would obviously have to be reconfigured to accommodate this new chord. Specifically, if the left touch sensor outfitted key 701 were now pressed from its C5 touch sensor 742, so as to put that touch sensor 742 into effect, the keyboard 700 keys 701 to 717 would be configured for corresponding notes C5 to E6, respectively, and subsequent pressing of the E5 key 705 and G5 key 708 would complete the C5 Major chord.

Unfortunately, as discussed above, when playing a chord in the normal fashion, it is impossible to assure that the chord keys will be pressed in a particular order. In the above example, unless the left touch sensor outfitted key 701 is the first pressed, either of the other chord keys 705 or 708 being pressed first would sound their corresponding notes an octave lower than desired for a C5 Major chord. So, rather than sound the chord keys when pressed, a brief delay from the time of the first pressed chord key is needed to assure that all chord keys have been pressed before any corresponding notes are sounded, thereby allowing sufficient time for the keyboard 700 to be correctly configured for a C5 Major chord.

To implement this logic in logic diagram 1000, the inputs of a 17-input OR gate 1040 are each connected to the output of one of the 17 keyboard 700 keys 701 to 717, such that when the first key of the C5 Major chord is pressed, the output of that OR gate 1040 transitions from LOW to HIGH, which triggers its connected one shots 1041 and 1042 and transitions their outputs from LOW to HIGH for 0.05 seconds and 0.10 seconds, respectively, and then back to LOW, which correspondingly transitions the outputs of the connected INV gates 1051 and 1052, respectively, from HIGH to LOW to HIGH. While the outputs of the INV gates 1051 and 1052 are LOW, the outputs of their connected AND gates 1001 to 1005 and 1006 to 1010, respectively, are forced LOW, such that no key presses can cause HIGH outputs for the respectively connected AND gates 1001 to 1005 and 1006 to 1010, thereby preventing their respectively connected latches 1011 to 1015 and 1016 to 1021 from becoming enabled to pass along their data. Therefore, all latches 1010 to 1021 will remain latched during that 0.05 second interval, and no new notes will be passed to their respective synths 1021 to 1025 for playing, thereby preventing any sounding of pressed keys during that time.

If the C5 touch sensor 742 of the left touch sensor outfitted key 701 has been pressed by the end of that 0.05 second interval, the output of the left radio button assembly 720, and the bus input of 3-state data bus 1031, will transition from note C4 (n=14) to note C5 (n=21), and the output of the key 701 will transition from LOW to HIGH, which will transition the S input of its connected NOR latch 1070, the input and output of its connected H->L delay 1081, and the connected input of its next connected NOR gate 1080 from LOW to HIGH, and which, since the R input of that NOR latch 1070 is already LOW due to the right touch sensor outfitted key 713 not being pressed and its LOW output being inverted to HIGH by its connected INV gate 1082 so as to thereby force the output of that NOR gate 1080 LOW, will transition the Q output of that NOR latch 1070, and the D input of its connected D latch 1073, from HIGH to LOW.

Since the right touch sensor outfitted key 713 is not pressed and its output is LOW, when the output of the left touch sensor outfitted key 701 transitions from LOW to HIGH, as discussed above, the output of its connected OR gate 1074 will transition from LOW to HIGH, which will trigger the next connected one shot 1075, such that its output, and the E input of its connected D latch 1073, will transition from LOW to HIGH for the 0.10 second duration of one shot 1075, and then back to LOW, which will, in turn, enable that D latch 1073 for that duration so as to pass its above mentioned LOW D input to its Q output, to the OE input of the right 3-state data bus 1032 and thereby disable that 3-state data bus 1032, and to its connected INV gate 1061 so as to invert it to HIGH at the OE input of the left 3-state data bus 1031 and thereby enable the output of the left 3-state data bus 1031.

The Q output of that D latch 1073, and the outputs of those 3-state data buses 1031 and 1032, will remain latched LOW, enabled, and disabled, respectively, until such time that the outputs of the touch sensor outfitted keys 701 and 713 are both LOW, and then either outfitted key 701 or 713 is pressed so as to once again trigger the aforementioned connected one shot 1075.

With the outputs of the left 3-state data bus 1031 being enabled, as discussed above, note C5 (n=21) will be passed to the input bus of each of its connected D latches 1011 to 1020, such that, when the output of the above mentioned one shot 1041 returns LOW at the conclusion of its 0.05 second interval, the input and the output of its connected INV gate 1051 will return LOW and HIGH, respectively, so as to then enable the outputs of the next connected AND gates 1001 to 1005 to transition from LOW to HIGH should their respectively connected keys 701, 705, 708, 713, and 717 be, or become, pressed, thereby enabling their respectively connected D latches 1011 to 1015. For those D latches 1011 to 1015 that do become enabled, the corresponding note x=n+k (where k is a key-specific integer) will be passed to their respectively connected synths 1021 to 1025, causing those notes to start sounding.

As can be seen from the logic diagram 1000, if the C5 Major chord keys 701, 705, and 708 are all pressed within that 0.05 second interval and the touch sensor outfitted key 701 was pressed from the C5 touch sensor 742, regardless of the order in which the keys 701, 705, and 708 were pressed, the C5 Major chord will be sounded. The 0.05 second delay in sounding the C5 Major chord was chosen long enough so as to guarantee that, in most cases, all three chord keys 701, 705, and 708 will all have been pressed within that time period, and short enough so as not to cause noticeable lag in the sounding of the chord.

Obviously, if a slightly longer delay were chosen, it would guarantee that more chord presses would be completed within the longer time period; however, it would also cause more noticeable lag in the sounding of the chord. So, rather than increasing that 0.05 second delay, the slightly longer, 0.10 second interval of the other above mentioned one shot 1042 can be utilized, such that, if prior to the completion of that 0.10 second interval, a different touch sensor comes into effect so as to reconfigure the keyboard 700 keys 701 to 717, the already started incorrect notes will be stopped, and the reconfigured correct notes will be started. While this 0.10 time period will not add any lag to the sounding of a chord, it must not be made too long or else the starting and stopping of the incorrect notes could cause noticeable noise in the playing of the chord.

To implement this logic in logic diagram 1000, at the conclusion of the 0.10 second interval of the aforementioned one shot 1042, its output, and the input of its connected INV gate 1052, will return LOW, causing that INV gate 1052 output to return HIGH, thereby enabling the outputs of its connected AND gates 1006 to 1010 to transition from LOW to HIGH should their connected keys 701, 705, 708, 713, and 717 respectively, be, or become, pressed, thereby enabling the respectively connected D latches 1016 to 1020. For those D latches 1016 to 1020 to become enabled, a corresponding note x=n+k (where k is a key-specific integer) will be passed to their respectively connected synths 1021 to 1025. If those notes are the same as the notes that the synths 1021 to 1025 already started sounding after the 0.05 second one shot 1041 interval, as discussed above, they will be ignored by the synths 1021 to 1025; otherwise, for each note that is different, the previously started note will be stopped, and the new note will be started.

As can be seen from the logic diagram 1000, if the C5 Major chord keys 701, 705, and 708 are all pressed, regardless of the pressing order, within the 0.10 second interval, that interval being long enough to guarantee that all the keys of a normally pressed chord will have been pressed, and if the touch sensor outfitted key 701 was pressed from the C5 touch sensor 742, then the the corresponding notes of the pressed keys will start sounding 0.05 seconds after the start of the key presses, and the C5 Major chord will be correctly playing, usually by that time, but if not, then definitely by the end of the 0.10 second interval.

Suppose now, say, 0.30 seconds after the C5 Major chord is released, it were desired to play the first inversion of a C4 Major chord (E4-G4-C5). Since the C5 touch sensor 742 would still be in effect due to the fact that, the Q output of the above mentioned NOR latch 1070 would remain latched LOW when its S input returns LOW and its R input remains LOW, and the C5 touch sensor 742 would, in GUI radio button fashion, remain pressed after its outfitted key 701 has been released if none of its other touch sensors 721 to 741 had since been pressed, none of the keyboard 700 keys 701 to 717 are currently configured for the corresponding notes E4 and G4; therefore, the keyboard 700 would now have to be reconfigured to accommodate this inverted chord.

Using the same logic as that discussed above for the logic diagram 1000, if the E4 touch sensor 739 (not shown in the logic diagram 1000) of the left touch sensor outfitted key 701 is pressed, that touch sensor 739 would be put into effect, which would reconfigure the keyboard 700 keys 701 to 717 for the corresponding notes E4 to G#5, respectively, and the subsequent, additional pressing of the G4 key 704 and C5 key 709 would play the first inversion of the C4 Major chord.

This, however, is not how the first inversion of a C4 Major chord would be played on an actual piano keyboard. Rather than the chord being based around its E4 note, as discussed above, it would be based around its C5 note. Once the C5 note is located on a piano, the finger position for the first inversion of a Major chord, which is the same for all Major chords, regardless of their root note, can be readily applied. This eliminates having to remember the bass note (i.e., E4) of such an inversion, which would be different for each of the 12 possible Major chord root notes.

Implementing such a C5-based first inversion of a C4 Major chord with the logic of logic diagram 1000 requires pressing the right touch sensor outfitted key 713 from its C5 touch sensor 772, so as to transition the output of the right radio button assembly 750, and the input of its connected 3-state data bus 1032 with its output still disabled, as discussed above, to note C5 (n=21), and so as to transition the output of that key 713, the connected input of its OR gate 1074, and the input of its connected INV gate 1082 from LOW to HIGH, which will transition the output of that INV gate 1082, and the connected input of its NOR gate 1080, from HIGH to LOW.

Since the output of the left touch sensor outfitted key 701, the connected input of its OR gate 1074, and the S input of its connected NOR latch 1070 are currently LOW due to that key 701 being released, and since the other input of the above mentioned NOR gate 1080 is currently LOW due to that key 701 having now been released for 0.30 seconds and its resulting HIGH to LOW output transition having already propagated from the input to the output of the connected H->L delay 1081 with its 0.20 second HIGH to LOW transition delay, the aforementioned LOW to HIGH output transition of the right touch sensor outfitted key 713 will additionally transition the output of its connected OR gate 1074, the input of the next connected one shot 1075, the output of the aforementioned NOR gate 1080, the R input and Q output of the aforementioned NOR latch 1070, and the D input of the NOR latch 1070 connected D latch 1073 from LOW to HIGH.

The LOW to HIGH transition of the one shot 1075 input will trigger it, and thereby transition its output, and the E input of its connected D latch 1073, from LOW to HIGH for a duration of 0.10 seconds, which will pass the above mentioned HIGH D input of the D latch 1073 to its Q output, to the OE input of the right 3-state data bus 1032 so as to enable its output, and to the input of the connected INV gate 1061 whose inverted LOW output will be passed to the OE input of the left 3-state data bus 1031 so as to disable its output.

With the output of the right 3-state data bus 1032 enabled, note C5 (n=21) will be passed to the input buses of the D latches 1011 to 1020. At this point, the logic to handle the pressing of the E4, G4, and C5 keys 705, 708, and 713, respectively, of the first inversion of a C4 Major chord would correspond with the logic for handling the pressing of the C5, E5, and G5 keys 701, 705, and 708, respectively, of the C5 Major chord, as thoroughly discussed above.

Figure 17:
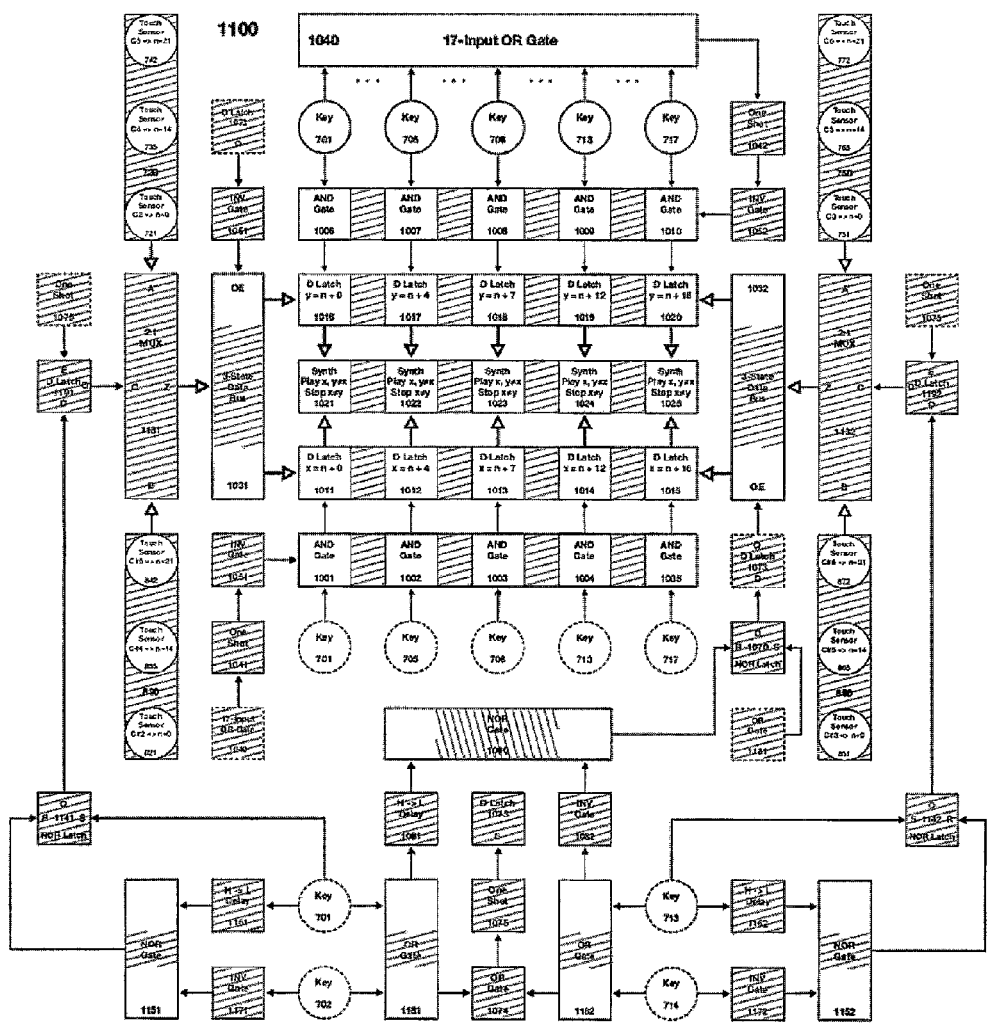
FIG. 17 is a logic diagram of the sixth keyboard embodiment shown in FIG. 14.

A logic diagram for the keyboards 800 and 900 of FIGS. 14 and 15, respectively, is shown in FIG. 17, and is designated generally as 1100. The logic of this current logic diagram 1100 is nearly identical to that of the previous logic diagram 1000 in FIG. 16, but with additional logic to handle the left and right touch sensor outfitted black keys 702 and 714, respectively, and the left and right black key radio button assemblies 820 and 850, respectively, that now supplement the left and right touch sensor outfitted white keys 701 and 713, respectively, and the left and right white key radio button assemblies 720 and 750, respectively. To similarly reduce the complexity of the current logic diagram 1100, for each of these two added touch sensor outfitted black keys 702 and 714, only three touch sensors 821, 835, and 842, and 851, 865, and 872, respectively, of their total touch sensors 821 to 842 and 851 to 872, respectively, are shown.

As is shown in the current logic diagram 1100, rather than the left touch sensor outfitted white key 701 being directly connected, as it was in the previous logic diagram 1000, to the S input of the NOR latch 1070 and to the input of the H->L delay 1081, it is now OR'd with the left touch sensor outfitted black key 702 via an OR gate 1181. Similarly, rather than the right touch sensor outfitted white key 713 being directly connected, as it was in the previous logic diagram 1000, to the INV gate 1082, it is now OR'd with the right touch sensor outfitted black key 714 via an OR gate 1182. As such, with regard to the NOR latch 1070, H->L delay 1081, and INV gate 1082, their logic that was previously controlled by the left touch sensor outfitted white key 701 and by the right touch sensor outfitted white key 713 is now controlled by either the white or black left touch sensor outfitted key 701 or 702, respectively, and by either the white or black right touch sensor outfitted key 713 or 714, respectively.

As is further shown in the current logic diagram 1100, rather than the left and right white key radio button assemblies 720 and 750, respectively, being each directly connected, as they were in the previous logic diagram 1000, to the respective left and right 3-state data buses 1031 and 1032, they are now multiplexed with the left and right black key radio button assemblies 820 and 850, respectively, via the left 2:1 MUX 1131 and the right 2:1 MUX 1132, respectively. The left 2:1 MUX 1131 is controlled by the left touch sensor outfitted keys 701 and 702 via a connected NOR latch 1141, NOR gate 1151, H ->L delay 1161, INV gate 1171, and D latch 1191, in the same manner that the right 3-state data bus 1032 was controlled in the previous logic diagram 1000 by the touch sensor outfitted white keys 701 and 713 via the respectively connected NOR latch 1070, NOR gate 1080, H->L delay 1081, INV gate 1082, and D latch 1073. Similarly, the right 2:1 MUX 1132 is correspondingly controlled by the right touch sensor outfitted keys 713 and 714 via a connected NOR latch 1142, NOR gate 1152, H->L delay 1162, INV gate 1172, and D latch 1192, respectively.

With this additional logic, it is now possible to play a chord of any type and root note, simply by positioning the fingers for that chord type, positioning the hand for the touch sensor associated with that root note, and then pressing.

The present invention may be embodied in other specific forms without departing from the spirit or essential attributes thereof. Accordingly, reference should be made to the appended claims rather than to the foregoing specification as indicating the scope of the invention.

I claim:

1. A piano-type keyboard apparatus, including a plurality of piano-type keys, where:
   each of said piano-type keys has a length;
   each of said piano-type keys can be pressed from a point along said length;
   each of said piano-type keys can sound a corresponding note when so pressed;
   said corresponding notes can be configured during play; and
   such configuring includes:
   one of said piano-type keys having been outfitted for touch detection;
   said touch detection identifying said press point of said outfitted key so pressed;
   said identified press point being associated with a specific note;
   said specific note being utilized in the setup of said corresponding notes;
   said setup being applied upon the designating of said pressed outfitted key; and
   said pressed outfitted key being so designated during such play.

2. A piano-type keyboard apparatus as in claim 1, where such designating includes a non-empty subset of:
   demarcating one of such pressed outfitted keys;
   demarcating one of such pressed outfitted keys,
      where such demarcating includes,
      recognizing the start of a series of such pressing of said piano-type keys;
   demarcating one of such pressed outfitted keys,
      where such demarcating includes,
      analyzing a series of such pressing of said piano-type keys while ongoing;
   demarcating one of such pressed outfitted keys,
      where such demarcating includes:
      recognizing the start of a series of such pressing of said piano-type keys; and
      analyzing said series while ongoing;
   demarcating one of such pressed outfitted keys,
      where such demarcating includes,
      recognizing the start of a series of such pressing of said piano-type keys by:
      making an observation of no said piano-type keys being so pressed; and
      confirming the first piano-type key so pressed after said observation;
   demarcating one of such pressed outfitted keys,
      where such demarcating includes,
      analyzing a series of such pressing of said piano-type keys while ongoing by:
      starting, upon a first key press, a number of brief consecutive intervals;
      making the first of said intervals the current interval; and
      iterating the following sequence for each of said intervals:
         waiting for the conclusion of said current interval;
         upon said conclusion, ascertaining such pressed outfitted keys;
         upon said conclusion, starting the next of said intervals; and
         making said next interval said current interval;
   demarcating one of such pressed outfitted keys,
      where such demarcating includes:
      recognizing the start of a series of such pressing of said piano-type keys by:
         making an observation of no said piano-type keys being so pressed; and
         confirming the first piano-type key so pressed after said observation; and
      analyzing said series while ongoing by:
         starting, upon said first key press, a number of brief consecutive intervals;
         making the first of said intervals the current interval; and
         iterating the following sequence for each of said intervals:

waiting for the conclusion of said current interval;
upon said conclusion, ascertaining such pressed outfitted keys;
upon said conclusion, starting the next of said intervals; and
making said next interval said current interval;
demarcating one of such pressed outfitted keys,
where such demarcating includes,
assigning a priority to each of said outfitted piano-type keys;
demarcating one of such pressed outfitted keys,
where such demarcating includes,
selecting one of such pressed outfitted keys in accordance with their priorities;
demarcating one of such pressed outfitted keys,
where such demarcating includes:
assigning a priority to each of said outfitted piano-type keys; and
selecting one of such pressed outfitted keys in accordance with said priorities;
demarcating one of such pressed outfitted keys,
where such demarcating includes,
assigning a priority to each of said outfitted piano-type keys by,
basing said priority on a non-empty subset of:
the importance of said outfitted piano-type key becoming so pressed; and
the timing of said outfitted piano-type key becoming so pressed;
demarcating one of such pressed outfitted keys,
where such demarcating includes,
selecting one of such pressed outfitted keys in accordance with their priorities by:
comparing said priorities of such pressed outfitted keys; and
choosing such pressed outfitted key having the highest said priority; and
demarcating one of such pressed outfitted keys,
where such demarcating includes:
assigning a priority to each of said outfitted piano-type keys by,
basing said priority on a non-empty subset of:
the importance of said outfitted key becoming so pressed; and
the timing of said outfitted key becoming so pressed; and
selecting one of such pressed outfitted keys in accordance with said priorities by:
comparing said priorities of such pressed outfitted keys; and
choosing such pressed outfitted key having the highest said priority.

3. A piano-type keyboard apparatus as in claim 1:
where such designating includes a subset of:
demarcating one of such pressed outfitted keys;
demarcating one of such pressed outfitted keys,
where such demarcating includes,
recognizing the start of a series of such pressing of said piano-type keys;
demarcating one of such pressed outfitted keys,
where such demarcating includes,
analyzing a series of such pressing of said piano-type keys while ongoing;
demarcating one of such pressed outfitted keys,
where such demarcating includes:
recognizing the start of a series of such pressing of said piano-type keys; and
analyzing said series while ongoing;
demarcating one of such pressed outfitted keys,
where such demarcating includes,
recognizing the start of a series of such pressing of said piano-type keys by:
making an observation of no said piano-type keys being so pressed; and
confirming the first piano-type key so pressed after said observation;
demarcating one of such pressed outfitted keys,
where such demarcating includes,
analyzing a series of such pressing of said piano-type keys while ongoing by:
starting, upon a first key press, a number of brief consecutive intervals;
making the first of said intervals the current interval; and
iterating the following sequence for each of said intervals:
waiting for the conclusion of said current interval;
upon said conclusion, ascertaining such pressed outfitted keys;
upon said conclusion, starting the next of said intervals; and
making said next interval said current interval;
demarcating one of such pressed outfitted keys,
where such demarcating includes:
recognizing the start of a series of such pressing of said piano-type keys by:
making an observation of no said piano-type keys being so pressed; and
confirming the first piano-type key so pressed after said observation; and
analyzing said series while ongoing by:
starting, upon said first key press, a number of brief consecutive intervals;
making the first of said intervals the current interval; and
iterating the following sequence for each of said intervals:
waiting for the conclusion of said current interval;
upon said conclusion, ascertaining such pressed'outfitted keys;
upon said conclusion, starting the next of said intervals; and
making said next interval said current interval;
demarcating one of such pressed outfitted keys,
where such demarcating includes,
assigning a priority to each of said outfitted piano-type keys;
demarcating one of such pressed outfitted keys,
where such demarcating includes,
selecting one of such pressed outfitted keys in accordance with their priorities;
demarcating one of such pressed outfitted keys,
where such demarcating includes:
assigning a priority to each of said outfitted piano-type keys; and
selecting one of such pressed outfitted keys in accordance with said priorities;
demarcating one of such pressed outfitted keys,
where such demarcating includes,
assigning a priority to each of said outfitted piano-type keys by,
basing said priority on a non-empty subset of:
the importance of said outfitted piano-type key becoming so pressed; and the timing of said outfitted piano-type key becoming so pressed;
demarcating one of such pressed outfitted keys,
  where such demarcating includes,
    selecting one of such pressed outfitted keys in accordance with their priorities by:
    comparing said priorities of such pressed outfitted keys; and
    choosing such pressed outfitted key having the highest said priority; and
demarcating one of such pressed outfitted keys,
  where such demarcating includes:
    assigning a priority to each of said outfitted piano-type keys by,
    basing said priority on a non-empty subset of:
      the importance of said outfitted key becoming so pressed; and
      the timing of said outfitted key becoming so pressed; and
    selecting one of such pressed outfitted keys in accordance with said priorities by:
      comparing said priorities of such pressed outfitted keys; and
      choosing such pressed outfitted key having the highest said priority;
where, for each of said outfitted keys:
said length can be partitioned into an ordered plurality of touch areas;
said touch detection can further so identify such touch area so pressed;
each of said touch areas can be so associated with an area note;
said area notes can be so utilized in such setup of said corresponding notes; and
said area notes are related by a subset of:
  being ordered in pitch by said order of said touch areas;
  being limited to the notes of a musical scale;
  being restricted to the same note across multiple octaves; and
  being coupled with others of said outfitted keys, so as to include a subset of:
    the number of said touch areas being equal; and
    the pitch intervals of similarly adjacent said touch areas being equal; and
where, upon one of such pressed outfitted keys having been so designated, such that:
  said pressed area of said designated key has been so identified; and
  said identified pressed area has been so associated with a designated note,
said configuring further includes a subset of:
basing said corresponding notes on said designated note;
basing said corresponding notes on said designated note,
  where said basing includes,
    setting said designated key to said designated note;
basing said corresponding notes on said designated note,
  where said basing includes,
    setting piano-type keys surrounding said designated key similarly to a piano;
basing said corresponding notes on said designated note,
  where said basing includes:
    setting said designated key to said designated note; and
    setting surrounding keys similarly to a piano;
basing said corresponding notes on said designated note,
  where said basing includes:
    noticing which of said piano-type keys are currently so pressed;
    assessing the chord formed by said currently pressed keys when hypothetically:
      setting said designated key to said designated note; and
      setting surrounding keys similarly to a piano;
    setting said designated key to the bass note of a revised chord whose:
      voicing is the same as that of said assessed chord; and
      root note is said designated note; and
    setting surrounding keys similarly to a piano; and
basing said corresponding notes on said designated note,
  where said basing includes:
    noticing which of said piano-type keys are currently so pressed;
    assessing the chord formed by said currently pressed keys when hypothetically:
      setting said designated key to said designated note; and
      setting surrounding keys similarly to a piano;
    setting said designated key to the bass note of a revised chord whose:
      voicing is different from that of said assessed chord; and
      root note is the same as that of said assessed chord; and
    setting surrounding keys similarly to a piano.

4. A piano-type keyboard apparatus as in claim 1,
where such configuring further includes a non-empty subset of:
at least one of said corresponding notes being muted;
at least one of said corresponding notes being doubled; and
at least one of said corresponding notes can be offset.

5. A piano-type keyboard apparatus as in claim 2,
where such configuring further includes a non-empty subset of:
at least one of said corresponding notes being muted;
at least one of said corresponding notes being doubled; and
at least one of said corresponding notes can be offset.

6. A piano-type keyboard apparatus as in claim 3,
where such configuring further includes a non-empty subset of:
at least one of said corresponding notes being muted;
at least one of said corresponding notes being doubled; and
at least one of said corresponding notes can be offset.

* * * * *